US012781073B2

(12) United States Patent
Canning et al.

(10) Patent No.: US 12,781,073 B2
(45) Date of Patent: Nov. 3, 2026

(54) PRINTING INK

(71) Applicant: Fujifilm Speciality Ink Systems Limited, Broadstairs (GB)

(72) Inventors: Sarah Canning, Broadstairs (GB); Jeremy Ward, Broadstairs (GB); Matthew Kite, Broadstairs (GB)

(73) Assignee: FUJIFILM SPECIALITY INK SYSTEMS LIMITED, Broadstairs (GB)

( * ) Notice: Subject to any disclaimer, the term of this patent is extended or adjusted under 35 U.S.C. 154(b) by 961 days.

(21) Appl. No.: 17/795,753

(22) PCT Filed: Jan. 28, 2021

(86) PCT No.: PCT/GB2021/050193

§ 371 (c)(1),
(2) Date: Jul. 27, 2022

(87) PCT Pub. No.: WO2021/152309

PCT Pub. Date: Aug. 5, 2021

(65) Prior Publication Data

US 2023/0094929 A1 Mar. 30, 2023

(30) Foreign Application Priority Data

| | | |
|---|---|---|
| Jan. 28, 2020 | (GB) | 2001156 |
| Oct. 13, 2020 | (GB) | 2016242 |
| Nov. 12, 2020 | (GB) | 2017868 |

(51) Int. Cl.

| | |
|---|---|
| ***C09D 11/38*** | (2014.01) |
| ***C08F 112/34*** | (2006.01) |
| ***C08F 116/12*** | (2006.01) |
| ***C08F 116/36*** | (2006.01) |
| ***C08F 122/10*** | (2006.01) |
| ***C08F 126/02*** | (2006.01) |
| ***C08F 126/06*** | (2006.01) |
| ***C08F 128/06*** | (2006.01) |
| ***C08F 130/02*** | (2006.01) |

(52) U.S. Cl.

CPC ............ *C09D 11/38* (2013.01); *C08F 112/34* (2013.01); *C08F 116/12* (2013.01); *C08F 116/36* (2013.01); *C08F 122/10* (2013.01); *C08F 126/02* (2013.01); *C08F 126/06* (2013.01); *C08F 128/06* (2013.01); *C08F 130/02* (2013.01)

(58) Field of Classification Search

CPC ..... C09D 11/38; C09D 11/101; C08F 112/34; C08F 116/12; C08F 116/36; C08F 122/10; C08F 126/02; C08F 126/06; C08F 128/06; C08F 130/02

See application file for complete search history.

(56) References Cited

U.S. PATENT DOCUMENTS

| | | | | |
|---|---|---|---|---|
| 2021/0009738 | A1* | 1/2021 | Illsley | C09D 11/107 |
| 2021/0186820 | A1* | 6/2021 | Chakraborty | A61C 7/002 |
| 2022/0073767 | A1* | 3/2022 | Harries | C09D 11/107 |
| 2023/0347663 | A1* | 11/2023 | Seguchi | B41J 2/175 |

FOREIGN PATENT DOCUMENTS

| | | | | |
|---|---|---|---|---|
| EP | 2832553 | A1 | 2/2015 | |
| EP | 2832804 | A1 * | 2/2015 | C09D 11/322 |
| JP | 2018188507 | A * | 11/2018 | |
| WO | 2014/035880 | A1 | 3/2014 | |

OTHER PUBLICATIONS

English machine translation of JP-2018188507-A (Year: 2018).*
International Search Report and Written Opinion for corresponding PCT Application No. PCT/GB2021/050193 mailed May 6, 2021.
European Search Report for Application No. GB2001156.5 mailed May 27, 2020.

* cited by examiner

*Primary Examiner* — Amber R Orlando
*Assistant Examiner* — Jeffrey Eugene Barzach
(74) *Attorney, Agent, or Firm* — Wood, Phillips, Katz, Clark & Mortimer

(57) ABSTRACT

The present invention provides an inkjet ink comprising: 10-50% by weight of one or more monomers each having a log $P_{octanol/water}$ value of 5.0 or more, based on the total weight of the ink; a photoinitiator package comprising one or more photoinitiators each having a log $P_{octanol/water}$ value of less than 4.0, and one or more photoinitiators selected from (I) and mixtures thereof, wherein n is a value from 1 to 10 and a+b+c is a value from 1 to 20; and wherein the one or more photoinitiators each having a log $P_{octanol/water}$ value of less than 4.0 are present in the ink in an amount of 0.5-4.5% by weight, based on the total weight of the ink. The present invention also provides a method of printing the inkjet ink of the present invention.

16 Claims, No Drawings

PRINTING INK

FIELD OF THE INVENTION

The present invention relates to a printing ink and in particular to an inkjet ink which has a desirable balance of properties.

BACKGROUND OF THE INVENTION

In inkjet printing, minute droplets of black, white or coloured ink are ejected in a controlled manner from one or more reservoirs or printing heads through narrow nozzles on to a substrate, which is moving relative to the reservoirs. The ejected ink forms an image on the substrate.

For high-speed printing, the inks must flow rapidly from the printing heads, and, to ensure that this happens, they must have in use a low viscosity, typically 200 mPas or less at 25° C., although in most applications the viscosity should be 50 mPas or less, and often 25 mPas or less. Typically, when ejected through the nozzles, the ink has a viscosity of less than 25 mPas, preferably 5-15 mPas and most preferably between 7-11 mPas at the jetting temperature, which is often elevated to, but not limited to 40-50° C. (the ink might have a much higher viscosity at ambient temperature).

The inks must also be resistant to drying or crusting in the reservoirs or nozzles. For these reasons, inkjet inks for application at or near ambient temperatures are commonly formulated to contain a large proportion of a mobile liquid vehicle or solvent such as water or a low-boiling solvent or mixture of solvents.

Another type of inkjet ink contains unsaturated organic compounds, termed monomers and/or oligomers, which polymerise when cured. This type of ink has the advantage that it is not necessary to evaporate the liquid phase to dry the print; instead the print is cured, a process which is more rapid than evaporation of solvent at moderate temperatures.

Inkjet inks can be printed onto a variety of substrates. Particularly challenging substrates for inkjet printing thereon are substrates for food packaging.

Food packaging represents a particular challenge on account of the strict safety limitations on the properties of materials that come into contact with food, including indirect additives like packaging inks. Accordingly, for printed food packaging, it is necessary to control and quantify the migration of the components of the printed image on the food packaging into the food products.

It is also desirable for food packaging applications to provide a cured ink with the necessary water resistance. This is important because the printed material is often sterilised in aqueous hydrogen peroxide or the final packaged product is stored in the fridge. In order to obtain improved water resistance, it is often required to include monomers and in particular, low polarity monomers.

Further, it is also advantageous for an inkjet ink to have a high cure speed for food packaging applications, in particular for single pass printing onto food packaging. By cure speed is meant the speed at which the actinic radiation source moves relative to the substrate. An advantage of a high cure speed is that a low dose per unit area is required to achieve a fully cured film. In order to achieve such cure speeds in inkjet inks for food packaging, blends of photoinitiators are often used. Unfortunately however, the blends of photoinitiators that are suitable for food packaging applications that also achieve a high cure speed, often experience solubility problems in the presence of the low polarity monomers that are required for good water resistance, particularly photoinitiators high in polarity, such as Esacure KIP 160.

In this regard, when using the blend of photoinitiators suitable for food packaging applications which provide a high cure speed, photoinitiators can precipitate out over time in the presence of low polarity monomers required for water resistance. This leads to a decrease in cure speed and can lead to print engine failure, in particular, problems with the printhead and ink supply, such as filters and nozzles becoming blocked.

There is therefore a need in the art to provide an ink which is suitable for food packaging with good water resistance properties and a high cure speed whilst maintaining the required ink stability.

BRIEF SUMMARY OF THE INVENTION

Accordingly, the present invention provides an inkjet ink comprising:

- 10-50% by weight of one or more monomers each having a log $P_{octanol/water}$ value of 5.0 or more, based on the total weight of the ink,
- a photoinitiator package comprising one or more photoinitiators each having a log $P_{octanol/water}$ value of less than 4.0, and one or more photoinitiators selected from

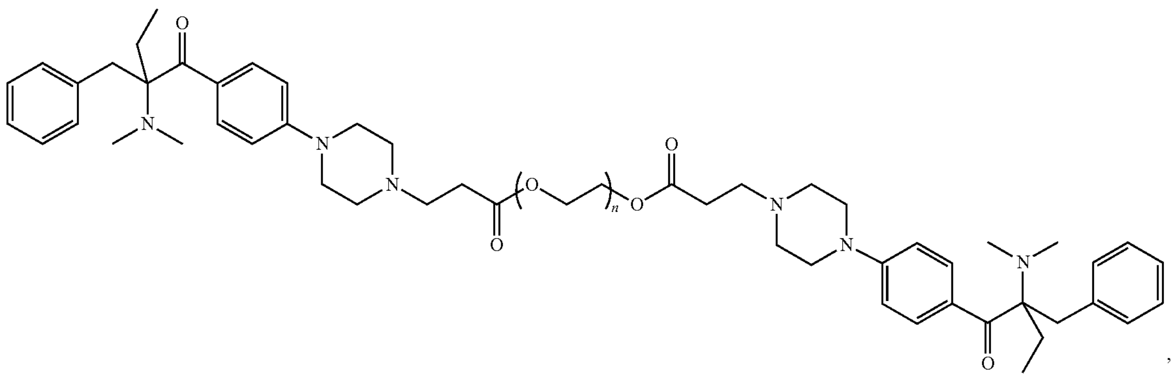
,

-continued
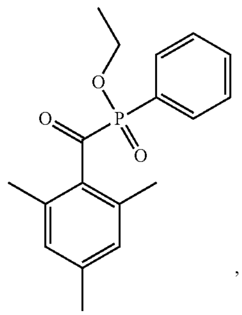
,
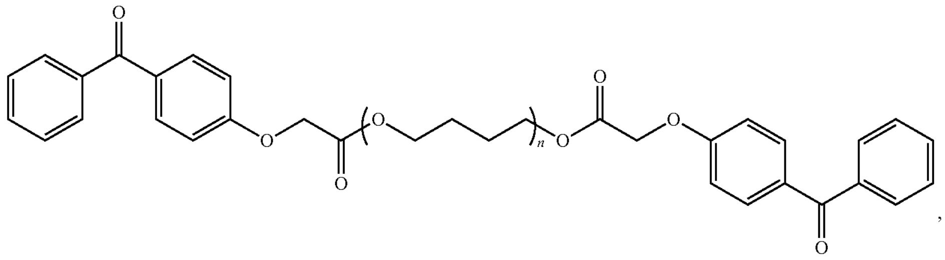
,
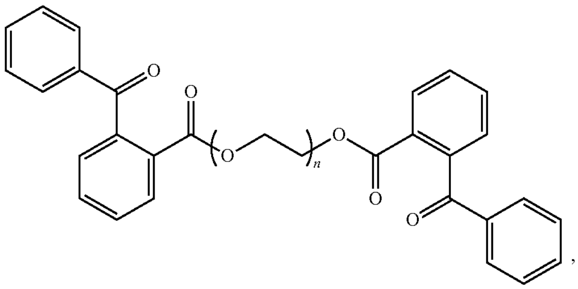
,
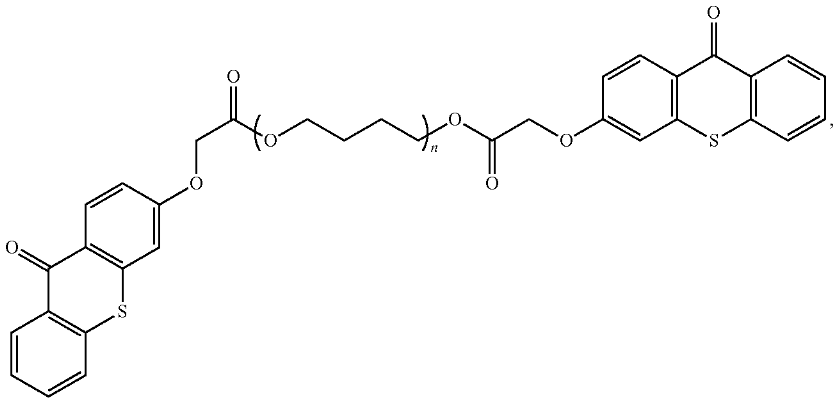
,
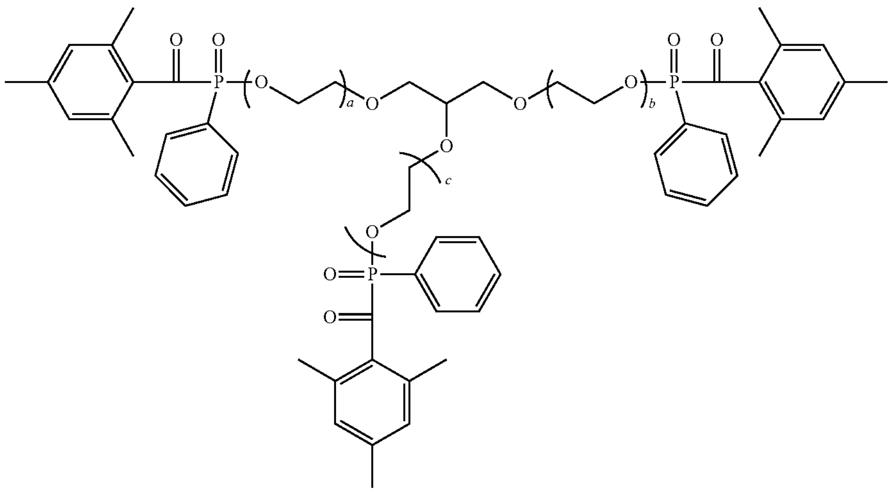

and mixtures thereof, wherein n is a value from 1 to 10 and a+b+c is a value from 1 to 20; and wherein the one or more photoinitiators each having a log $P_{octanol/water}$ value of less than 4.0 are present in the ink in an amount of 0.5-4.5% by weight, based on the total weight of the ink.

DETAILED DESCRIPTION OF THE INVENTION

The inventors have surprisingly found that the addition of one or more photoinitiators having the structures shown above to an inkjet ink containing 10-50% by weight of one or more monomers each having a log $P_{octanol/water}$ value of 5.0 or more, based on the total weight of the ink, and restricting the one or more photoinitiators each having a log $P_{octanol/water}$ value of less than 4.0 present in the ink to 0.5-4.5% by weight, based on the total weight of the ink, results in an ink having good water resistance properties and a high cure speed whilst maintaining the required stability of the ink. Advantageously therefore, the ink of the present invention does not cause print engine failure which occurs when an ink does not have the required stability.

The inkjet ink of the present invention comprises 10-50% by weight of one or more monomers each having a log $P_{octanol/water}$ value of 5.0 or more, based on the total weight of the ink.

Monomers typically have a molecular weight of less than 600 Daltons, preferably more than 200 Daltons and less than 450 Daltons. Monomers are typically added to inkjet inks to reduce the viscosity of the inkjet ink. They therefore preferably have a viscosity of less than 150 mPas at 25° C., more preferably less than 100 mPas at 25° C. and most preferably less than 20 mPas at 25° C. Monomer viscosities can be measured using an ARG2 rheometer manufactured by T.A. Instruments, which uses a 40 mm oblique/2° steel cone at 25° C. with a shear rate of 25 $s^{-1}$.

As is known in the art, monomers may possess different degrees of functionality, which include mono, di, tri and higher functionality monomers.

Log P is known in the art and a detailed description is not required. Log P is a measure of the polarity of a compound. The partition coefficient (P) is the ratio of concentrations of a compound in a mixture of two immiscible phases at equilibrium. Therefore, this ratio is a measure of the difference in solubility of the compound in these two phases. Both phases are usually solvents. The two solvents have different polarity and the most common solvents are water and 1-octanol (octanol). Water is the polar solvent and octanol is the non-polar solvent.

Log P is the logarithm of the ratio of the concentrations of a solute between the two solvents, specifically for un-ionised solutes. Accordingly, log P value is a measure of the lipophilicity or hydrophilicity. When the two phases are water and octanol:

$$\log P_{oct/wat} = \log\left(\frac{[\text{solute}]^{\textit{un-ionized}}_{\text{octanol}}}{[\text{solute}]^{\textit{un-ionized}}_{\text{water}}}\right).$$

To measure the partition coefficient of ionisable solutes, the pH of the aqueous phase is adjusted such that the predominant form of the compound in solution is the un-ionised. A number of methods of measuring partition coefficients have been developed including the shake-flask, reverse phase HPLC and pH-metric techniques.

Partition coefficients are also widely available in the art and may also be theoretical and based on the structure of the compound. For example, partition coefficients may be calculated using software, such as ChemSketch, or online on websites, such as the Chemicalize website. The partition coefficients discussed herein are theoretical values that were determined using the Chemicalize website.

The log $P_{octanol/water}$ value defines the relative polarity/hydrophilicity of components of the ink. High log $P_{octanol/water}$ values, such as a log $P_{octanol/water}$ value of 4.0 or more, indicate low polarity. Monomers having a log $P_{octanol/water}$ value of 5.0 or more are low polarity monomers. Accordingly, the inkjet ink of the present invention comprises 10-50% by weight of one or more monomers each having a low polarity, based on the total weight of the ink.

The one or more monomers each have a log $P_{octanol/water}$ value of 5.0 or more, preferably 5.5 or more. Preferably, the one or more monomers each having a log $P_{octanol/water}$ value of 5.0 or more, preferably 5.5 or more, each have a log $P_{octanol/water}$ value of less than 9.0.

The inclusion of low polarity monomers in the ink of the present invention provides the ink with good film properties including water resistance. Water resistance is particularly important for food packaging applications, where the printed material is often sterilised in aqueous hydrogen peroxide or the final packaged product is stored in the fridge.

The one or more monomers each having a log $P_{octanol/water}$ value of 5.0 or more are not particularly limited and are only limited by the constraints imposed by the use in an inkjet ink, such as viscosity, stability, toxicity etc.

In a preferred embodiment, the one or more monomers each having a log $P_{octanol/water}$ value of 5.0 or more comprise one or more monofunctional monomers each having a log $P_{octanol/water}$ value of 5.0 or more, i.e. the one or more monomers each having a log $P_{octanol/water}$ value of 5.0 have one functional group which takes part in the polymerisation reaction on curing. The functional group can be any group that is capable of polymerising upon exposure to radiation and is preferably selected from a (meth)acrylate group and a vinyl ether group.

If present, the one or more monofunctional monomers each having a log $P_{octanol/water}$ value of 5.0 are preferably the sole one or more monomers each having a log $P_{octanol/water}$ value of 5.0 present in the ink.

More preferably, the one or more monomers each having a log $P_{octanol/water}$ value of 5.0 or more comprise one or more monofunctional (meth)acrylate monomers each having a log $P_{octanol/water}$ value of 5.0 or more. Monofunctional (meth) acrylate monomers having a log $P_{octanol/water}$ value of 5.0 or more are well known in the art and are preferably the esters of acrylic acid. Mixtures of monofunctional (meth)acrylate monomers each having a log $P_{octanol/water}$ value of 5.0 or more may be used.

If present, the one or more monofunctional (meth) acrylate monomers each having a log $P_{octanol/water}$ value of 5.0 are preferably the sole one or more monomers each having a log $P_{octanol/water}$ value of 5.0 present in the ink.

A preferred example of a monofunctional (meth)acrylate monomer having a log $P_{octanol/water}$ value of 5.0 or more is lauryl acrylate. Lauryl acrylate has a log $P_{octanol/water}$ value of 5.8.

In a preferred embodiment, the one or more monomers each having a log $P_{octanol/water}$ value of 5.0 or more comprise lauryl acrylate. Put another way, the ink preferably comprises lauryl acrylate. Preferably, lauryl acrylate is the sole monofunctional (meth)acrylate monomer having a log $P_{octanol/water}$ value of 5.0 or more present in the ink. More preferably, lauryl acrylate is the sole monofunctional monomer having a log $P_{octanol/water}$ value of 5.0 or more present in the ink. Most preferably, lauryl acrylate is the sole monomer having a log $P_{octanol/water}$ value of 5.0 or more present in the ink.

Lauryl acrylate is preferred because it has a long straight chain that introduces flexibility into the cured ink film.

The one or more monomers each having a log $P_{octanol/water}$ value of 5.0 or more may comprise one or more di-, tri-, tetra-, penta- or hexa-functional monomers having two, three, four, five or six functional groups respectively which take part in the polymerisation reaction on curing.

The functional group of the one or more di-, tri-, tetra-, penta- or hexa-functional monomers each having a log $P_{octanol/water}$ value of 5.0 or more may be the same or different but must take part in the polymerisation reaction on curing. Examples of such functional groups include any groups that are capable of polymerising upon exposure to radiation and are preferably selected from a (meth)acrylate group and a vinyl ether group.

The one or more di-, tri-, tetra-, penta- or hexa-functional monomers each having a log $P_{octanol/water}$ value of 5.0 or more may possess different degrees of functionality, and a mixture including combinations of di, tri and higher functionality monomers may be used.

The one or more di-, tri-, tetra-, penta- or hexa-functional monomers each having a log $P_{octanol/water}$ value of 5.0 or more may be selected from (meth)acrylate monomers, vinyl ether monomers, vinyl ether (meth)acrylate monomers and mixtures thereof. Such monomers having a log $P_{octanol/water}$ value of 5.0 or more are well known in the art and a detailed description is therefore not required.

In a preferred embodiment, the inkjet ink comprises 15-40% by weight of one or more monomers each having a log $P_{octanol/water}$ value of 5.0 or more, based on the total weight of the ink.

The inkjet ink of the present invention may further comprise one or more additional monomers. By one or more additional monomers is meant one or more monomers other than a monomer having a log $P_{octanol/water}$ value of 5.0 or more. Accordingly, the one or more additional monomers are distinct from the one or more monomers each having a log $P_{octanol/water}$ value of 5.0 or more.

Preferred examples of the one or more additional monomers is a mono-, di-, tri-, tetra-, penta- or hexa-functional monomer, i.e. the one or more additional multifunctional monomers has one, two, three, four, five or six functional groups. The one or more additional monomers preferably comprise one or more difunctional monomers and more preferably, two or more difunctional monomers.

The functional group of the one or more additional monomers may be the same or different but must take part in the polymerisation reaction on curing. Examples of such functional groups include any groups that are capable of polymerising upon exposure to radiation and are preferably selected from a (meth)acrylate group and a vinyl ether group.

The one or more additional monomers may possess different degrees of functionality, and a mixture including combinations of mono-, di, tri and higher functionality monomers may be used.

The one or more additional monomers cannot have a log $P_{octanol/water}$ value of 5.0 or more. Otherwise, the substituents of the one or more additional monomers are only limited by the constraints imposed by the use in an inkjet ink, such as viscosity, stability, toxicity etc. The substituents are typically alkyl, cycloalkyl, aryl and combinations thereof, any of which may be interrupted by heteroatoms. Non-limiting examples of substituents commonly used in the art include $C_{1-18}$ alkyl, $C_{3-18}$ cycloalkyl, $C_{6-10}$ aryl and combinations thereof, such as $C_{6-10}$ aryl- or $C_{3-18}$ cycloalkyl-substituted $C_{1-18}$ alkyl, any of which may be interrupted by 1-10 heteroatoms, such as nitrogen further substituted by any of the above described substituents. The substituents may together also form a cyclic structure.

The one or more additional monomers may be selected from monofunctional (meth)acrylate monomers, N-vinyl amide monomers, N-(meth)acryloyl amine monomers, N-vinyl carbamate monomers, difunctional (meth)acrylate monomers, multifunctional (meth)acrylate monomers, difunctional vinyl ether monomers, multifunctional vinyl ether monomers, difunctional vinyl ether (meth)acrylate monomers, multifunctional vinyl ether (meth)acrylate monomers and mixtures thereof. Monomers of the one or more additional monomers are well known in the art and a detailed description is not required.

For the avoidance of doubt, mono and difunctional are intended to have their standard meanings, i.e. one or two groups, respectively, which take part in the polymerisation reaction on curing. Multifunctional (which does not include difunctional) is intended to have its standard meaning, i.e. three or more groups, respectively, which take part in the polymerisation reaction on curing.

Examples of the one or more additional monofunctional (meth)acrylate monomer include cyclic monofunctional (meth)acrylate monomers and acyclic-hydrocarbon monofunctional (meth)acrylate monomers.

In a preferred embodiment, if present, the one or more additional monofunctional (meth)acrylate monomers each have a molecular weight of 195 g/mol or higher. Such monomers are less prone to migration for food packaging applications.

Tetrahydrofurfuryl acrylate (THFA) is often used to provide good adhesion to variety of substrates, as well as producing a flexible film which is less liable to cracking and delamination. A further advantage of THFA is that it can solubilise chlorinated polyolefins, which in turn provides good adhesion to polyolefin substrates. However, THFA is a hazardous monomer and bears the GHS hazard statement H314 (Causes severe skin burns and eye damage). There is also growing evidence that it may damage fertility or the unborn child. Thus, there is an urgent need in the art to move away from THFA.

The ink will still function in the presence of tetrahydrofurfuryl acrylate (THFA), in terms of its printing and curing properties. However, to avoid the hazardous nature of THFA, the ink preferably contains less than 2% by weight, more preferably less than 1% by weight, more preferably is substantially free of THFA, based on the total weight of the ink.

By substantially free is meant that only small amounts will be present, for example as impurities in the radiation-curable materials present or as a component in a commercially available pigment dispersion. In other words, no THFA is intentionally added to the ink. However, minor amounts of THFA, which may be present as impurities in commercially available inkjet ink components, are tolerated. For example, the ink may comprise less than 0.5% by weight of THFA, more preferably less than 0.1% by weight of THFA, most preferably less than 0.05% by weight of THFA, based on the total weight of the ink. In a preferred embodiment, the inkjet ink is free of THFA.

For food packaging applications, the Swiss Ordinance on Materials and Articles in Contact with Food (SR 817.023.21) sets out provisions for inks. Annex 10 lists permitted substances for the production of food packaging inks. Substances not listed should not be used for food packaging inks. Caution should still be used for some substances on the Swiss Ordinance list and there is some concern about the quality and safety of the monofunctional (meth)acrylate monomers isodecyl acrylate (IDA), octyl acrylate, phenoxyethyl acrylate (PEA) and 2-ethylhexyl acrylate (2-EHA).

The ink preferably contains less than 2% by weight, more preferably less than 1% by weight, more preferably is substantially free of each of IDA, octyl acrylate, PEA and 2-EHA, based on the total weight of the ink. More preferably, the ink contains less than 5% by weight, more preferably less than 2% by weight, more preferably less than 1% by weight, more preferably is substantially free of IDA, octyl acrylate, PEA and 2-EHA in combination, based on the total weight of the ink.

By substantially free is meant that only small amounts will be present, for example as impurities in the radiation-curable materials present or as a component in a commercially available pigment dispersion. In other words, no IDA, octyl acrylate, PEA and 2-EHA is intentionally added to the ink. However, minor amounts of IDA, octyl acrylate, PEA and 2-EHA, which may be present as impurities in commercially available inkjet ink components, are tolerated. For example, the ink may comprise less than 0.5% by weight of each of IDA, octyl acrylate, PEA and 2-EHA, more preferably less than 0.1% by weight of each of IDA, octyl acrylate, PEA and 2-EHA, most preferably less than 0.05% by weight of each of IDA, octyl acrylate, PEA and 2-EHA, based on the total weight of the ink. Preferably, the ink may comprise less than 0.5% by weight of IDA, octyl acrylate, PEA and 2-EHA in combination, more preferably less than 0.1% by weight of IDA, octyl acrylate, PEA and 2-EHA in combination, most preferably less than 0.05% by weight of IDA, octyl acrylate, PEA and 2-EHA in combination, based on the total weight of the ink. In a preferred embodiment, the inkjet ink is free of IDA, octyl acrylate, PEA and 2-EHA.

N-Vinyl amide monomers are well-known monomers in the art. N-Vinyl amide monomers have a vinyl group attached to the nitrogen atom of an amide which may be further substituted in an analogous manner to the (meth) acrylate monomers. Examples include N-vinyl caprolactam (NVC), N-vinyl pyrrolidone (NVP), N-vinyl piperidone, N-vinyl formamide and N-vinyl acetamide.

Similarly, N-acryloyl amine monomers are also well-known in the art. N-Acryloyl amine monomers also have a vinyl group attached to an amide but via the carbonyl carbon atom and again may be further substituted in an analogous manner to the (meth)acrylate monomers. An example is N-acryloylmorpholine (ACMO).

N-Vinyl carbamate monomers are defined by the following functionality:

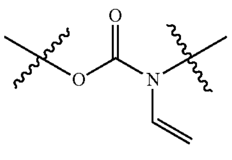 [SMILES: *OC(=O)N(*)C=C]

The synthesis of N-vinyl carbamate monomers is known in the art. For example, vinyl isocyanate, formed by the Curtius rearrangement of acryloyl azide, can be reacted with an alcohol to form N-vinyl carbamates (Phosgenations—A Handbook by L. Cotarca and H. Eckert, John Wiley & Sons, 2003, 4.3.2.8, pages 212-213).

In a preferred embodiment, if present, the N-vinyl carbamate monomer is an N-vinyl oxazolidinone. N-Vinyl oxazolidinones have the following structure:

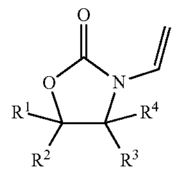

in which $R^1$ to $R^4$ are not limited other than by the constraints imposed by the use in an ink-jet ink, such as viscosity, stability, toxicity etc. The substituents are typically hydrogen, alkyl, cycloalkyl, aryl and combinations thereof, any of which may be interrupted by heteroatoms. Non-limiting examples of substituents commonly used in the art include $C_{1-18}$ alkyl, $C_{3-18}$ cycloalkyl, $C_{6-10}$ aryl and combinations thereof, such as $C_{6-10}$ aryl- or $C_{3-18}$ cycloalkyl-substituted $C_{1-18}$ alkyl, any of which may be interrupted by 1-10 heteroatoms, such as oxygen or nitrogen, with nitrogen further substituted by any of the above described substituents. Preferably $R^1$ to $R^4$ are independently selected from hydrogen or $C_{1-10}$ alkyl. Further details may be found in WO 2015/022228 and U.S. Pat. No. 4,831,153.

An example of an N-vinyl carbamate monomer is N-vinyl-5-methyl-2-oxazolidinone (known as NVMO or VMOX). It is available from BASF and has the following structure:

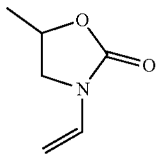

molecular weight 127 g/mol

NVMO has the IUPAC name 5-methyl-3-vinyl-1,3-oxazolidin-2-one and CAS number 3395-98-0. NVMO includes the racemate and both enantiomers. In one embodiment, the N-vinyl carbamate monomer is a racemate of NVMO. In another embodiment, the N-vinyl carbamate monomer is (R)-5-methyl-3-vinyl-1,3-oxazolidin-2-one. Alternatively, the N-vinyl carbamate monomer is (S)-5-methyl-3-vinyl-1,3-oxazolidin-2-one.

In a preferred embodiment, if present, the at least one N-vinyl amide monomer, N-(meth)acryloyl amine monomer and/or N-vinyl carbamate monomer each have a molecular weight of 195 g/mol or higher. Such monomers are less prone to migration for food packaging applications.

If present, the one or more additional monomers may include one or more N-vinyl monomers other than an N-vinyl amide monomer, N-(meth)acryloyl amine monomer and/or N-vinyl carbamate monomer. Examples include N-vinyl carbazole, N-vinyl indole and N-vinyl imidazole.

In a preferred embodiment, if present, the one or more N-vinyl monomers other than an N-vinyl amide monomer, N-(meth)acryloyl amine monomer and/or N-vinyl carbamate monomer each have a molecular weight of 195 g/mol or higher. Such monomers are less prone to migration for food packaging applications.

Difunctional (meth)acrylate monomers are well known in the art and a detailed description is therefore not required. Examples include hexanediol diacrylate (HDDA), 1,8-octanediol diacrylate, 1,9-nonanediol diacrylate, 1,10-decanediol diacrylate (DDDA), 1,11-undecanediol diacrylate and 1,12-dodecanediol diacrylate, polyethylene glycol diacrylate (for example tetraethylene glycol diacrylate, PEG200DA, PEG300DA, PEG400DA, PEG600DA), dipropylene glycol diacrylate (DPGDA), tripropylene glycol diacrylate (TPGDA), tricyclodecane dimethanol diacrylate (TCDDMDA), neopentylglycol diacrylate, 3-methyl-1,5-pentanediol diacrylate (3-MPDDA), and the acrylate esters of ethoxylated or propoxylated glycols and polyols, for example, propoxylated neopentylglycol diacrylate (NPGPODA), and mixtures thereof. Also included are esters of methacrylic acid (i.e. methacrylates), such as hexanediol dimethacrylate, 1,8-octanediol dimethacrylate, 1,9-nonanediol dimethacrylate, 1,10-decanediol dimethacrylate, 1,11-undecanediol dimethacrylate and 1,12-dodecanediol dimethacrylate, triethyleneglycol dimethacrylate, diethyleneglycol dimethacrylate, ethyleneglycol dimethacrylate, 1,4-butanediol dimethacrylate and mixtures thereof. 3-MPDDA is particularly preferred.

Suitable multifunctional (meth)acrylate monomers (which do not include difunctional (meth)acrylate monomers) include tri-, tetra-, penta-, hexa-, hepta- and octa-functional monomers. Examples of the multifunctional acrylate monomers that may be included in the inkjet inks include trimethylolpropane triacrylate, dipentaerythritol triacrylate, tri(propylene glycol) triacrylate, bis(pentaerythritol) hexaacrylate, and the acrylate esters of ethoxylated or propoxylated glycols and polyols, for example, ethoxylated trimethylolpropane triacrylate and ethoxylated pentaerythritol tetraacrylate (EOPETTA, also known as PPTTA), and mixtures thereof. Suitable multifunctional (meth)acrylate monomers also include esters of methacrylic acid (i.e. methacrylates), such as trimethylolpropane trimethacrylate. Mixtures of (meth)acrylates may also be used.

Examples of divinyl ether monomers include triethylene glycol divinyl ether (DVE-3), diethylene glycol divinyl ether, 1,4-cyclohexanedimethanol divinyl ether, bis[4-(vinyloxy)butyl] 1,6-hexanediylbiscarbamate, bis[4-(vinyloxy) butyl] isophthalate, bis[4-(vinyloxy)butyl] (methylenedi-4, 1-phenylene)biscarbamate, bis[4-(vinyloxy)butyl] succinate, bis[4-(vinyloxy)butyl]terephthalate, bis[4-(vinyloxymethyl)cyclohexylmethyl] glutarate, 1,4-butanediol divinyl ether and mixtures thereof.

Triethylene glycol divinyl ether (DVE-3) is particularly preferred. DVE-3 is preferred because of its low viscosity. It has a lower viscosity than the equivalent acrylate monomer because the vinyl ether groups have fewer polar interactions than acrylates.

An example of a multifunctional vinyl ether monomer is tris[4-(vinyloxy)butyl] trimellitate.

Examples of vinyl ether (meth)acrylate monomers include 2-(2-vinyloxy ethoxy)ethyl acrylate (VEEA), 2-(2-vinyloxy ethoxy)ethyl methacrylate (VEEM) and mixtures thereof.

In a preferred embodiment, the inkjet ink comprises one or more additional monomers selected from 1,10-decanediol diacrylate (DDDA), hexanediol diacrylate (HDDA), polyethylene glycol diacrylate, tripropylene glycol diacrylate (TPGDA), 3-methyl 1,5-pentanediol diacrylate (3-MPDDA), dipropylene glycol diacrylate (DPGDA), tricyclodecane dimethanol diacrylate (TCDDMDA), propoxylated neopentyl glycol diacrylate (NPGPODA), trimethylolpropane triacrylate (TMPTA), di-trimethylolpropane tetraacrylate (DiTMPTA), di-pentaerythritol hexaacrylate (DPHA), ethoxylated trimethylolpropane triacrylate (EOTMPTA), ethoxylated pentaerythritol tetraacrylate (EOPETTA), triethylene glycol divinyl ether (DVE-3) and mixtures thereof.

In a preferred embodiment, the inkjet ink preferably comprises one or more additional monomers selected from 1,10-decanediol diacrylate (DDDA), ethoxylated (5) hexanediol diacrylate (HD(EO)DA), polyethylene glycol (600) diacrylate (PEG600DA), tripropylene glycol diacrylate (TPGDA), 3-methyl 1,5-pentanediol diacrylate (3-MPDDA), tricyclodecane dimethanol diacrylate (TCDDMDA), propoxylated neopentyl glycol diacrylate (NPGPODA), di-trimethylolpropane tetraacrylate (DiTMPTA), di-pentaerythritol hexaacrylate (DPHA), ethoxylated trimethylolpropane triacrylate (EOTMPTA), ethoxylated pentaerythritol tetraacrylate (EOPETTA), triethylene glycol divinyl ether (DVE-3) and mixtures thereof. These are particularly preferred for use in food packaging applications.

In a preferred embodiment, the inkjet ink comprises one or more difunctional monomers other than the one or more monomers each having a log $P_{octanol/water}$ value of 5.0 or more selected from 1,10-decanediol diacrylate (DDDA), hexanediol diacrylate (HDDA), polyethylene glycol diacrylate, tripropylene glycol diacrylate (TPGDA), 3-methyl 1,5-pentanediol diacrylate (3-MPDDA), dipropylene glycol diacrylate (DPGDA), tricyclodecane dimethanol diacrylate (TCDDMDA), propoxylated neopentyl glycol diacrylate (NPGPODA), triethylene glycol divinyl ether (DVE-3) and mixtures thereof.

In a preferred embodiment, the inkjet ink preferably comprises one or more difunctional monomers other than the one or more monomers each having a log $P_{octanol/water}$ value of 5.0 or more selected from 1,10-decanediol diacrylate (DDDA), ethoxylated (5) hexanediol diacrylate (HD (EO)DA), polyethylene glycol (600) diacrylate (PEG600DA), tripropylene glycol diacrylate (TPGDA), 3-methyl 1,5-pentanediol diacrylate (3-MPDDA), tricyclodecane dimethanol diacrylate (TCDDMDA), propoxylated neopentyl glycol diacrylate (NPGPODA), triethylene glycol divinyl ether (DVE-3) and mixtures thereof. These are particularly preferred for use in food packaging applications.

Preferably, the inkjet ink comprises 3-methyl 1,5-pentanediol diacrylate (3-MPDDA) and triethylene glycol divinyl ether (DVE-3). More preferably, 3-methyl 1,5-pentanediol diacrylate (3-MPDDA) and triethylene glycol divinyl ether (DVE-3) are the sole one or more difunctional monomers other than the one or more monomers each having a log $P_{octanol/water}$ value of 5.0 present in the ink and most preferably, 3-methyl 1,5-pentanediol diacrylate (3-MPDDA) and triethylene glycol divinyl ether (DVE-3) are the sole one or more additional monomers other than the one or more monomers each having a log $P_{octanol/water}$ value of 5.0.

In a preferred embodiment, the one or more additional monomers are present at 20-80% by weight, more preferably 30-70% by weight, and most preferably 40-60% by weight, based on the total weight of the ink.

The inkjet ink of the present invention further comprises a photoinitiator package comprising one or more photoinitiators each having a log $P_{octanol/water}$ value of less than 4.0. Accordingly, the photoinitiator package comprises one or more photoinitiators each having a high polarity.

High polarity photoinitiators are required to achieve the necessary cure speed for single pass food packaging applications.

The one or more photoinitiators each have a log $P_{octanol/water}$ value of less than 4.0, preferably less than 3.5, more preferably 3.0 or less. Preferably, the one or more photoinitiators each have a log $P_{octanol/water}$ value of 0.5 or more to less than 4.0, more preferably 0.5 or more to less than 3.5 and most preferably 0.5 or more to 3.0 or less.

Such photoinitiators having a high polarity are well known in the art and a detailed description is therefore not required.

Examples of photoinitiators having a log $P_{octanol/water}$ value of less than 4.0 include Esacure KIP 160 and Omnirad 2959.

Esacure KIP 160 has the following chemical structure:

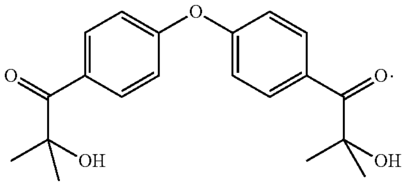 [SMILES: CC(C)(O)C(=O)c1ccc(Oc2ccc(C(=O)C(C)(C)O)cc2)cc1]

It has the chemical name 2-hydroxy-1-[4-[4-(2-hydroxy-2-methylpropanoyl)phenoxy]phenyl]-2-methylpropan-1-one and is commercially available from IGM with CAS number 71868-15-0. Esacure KIP 160 has a log $P_{octanol/water}$ value of 3.0.

Omnirad 2959 has the following chemical structure:

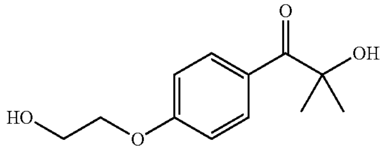 [SMILES: CC(C)(O)C(=O)c1ccc(OCCO)cc1]

It has the chemical name 2-hydroxy-1-(4-(2-hydroxyethoxy)phenyl)-2-methylpropan-1-one and is commercially available from IGM with CAS number 106797-53-9. Omnirad 2959 has a log $P_{octanol/water}$ value of 0.9.

Unfortunately, it has been found that the one or more high polarity photoinitiators present in the ink, which are required for cure speed, are incompatible with the one or more low polarity monomers present in the ink, which are required for water resistance.

In particular, the one or more high polarity photoinitiators present in the ink can precipitate out over time in the presence of 10-50% by weight of the one or more low polarity monomers, based on the total weight of the ink. Precipitated photoinitiator leads to a reduction in cure speed and can block filters and printhead nozzles leading to print engine failure. By print engine is meant the combination of printhead and ink supply, the latter being comprised of reservoirs, tubing and filters.

It is not possible to remove either the one or more high polarity photoinitiators or the one or more low polarity monomers because these components are required for water resistance and curing.

The inventors have found that the inclusion of one or more specific photoinitiators in an ink with 10-50% by weight of the one or more low polarity monomers, based on the total weight of the ink, whilst restricting the amount of the one or more high polarity photoinitiators in the ink surprisingly achieves a high cure speed whilst maintaining the required ink stability. By the required ink stability is meant that print engine failure does not occur caused by photoinitiators precipitating out of solution.

Therefore, the one or more photoinitiators each having a log $P_{octanol/water}$ value of less than 4.0 are only present in the ink in an amount of 0.5-4.5% by weight, based on the total weight of the ink.

Preferably, the one or more photoinitiators each having a log $P_{octanol/water}$ value of less than 4.0 are present in the ink in an amount of 1.0-4.0% by weight, more preferably in an amount of 1.5-3.5% by weight based on the total weight of the ink.

Further, the photoinitiator package of the inkjet ink of the present invention further comprises one or more photoinitiators selected from

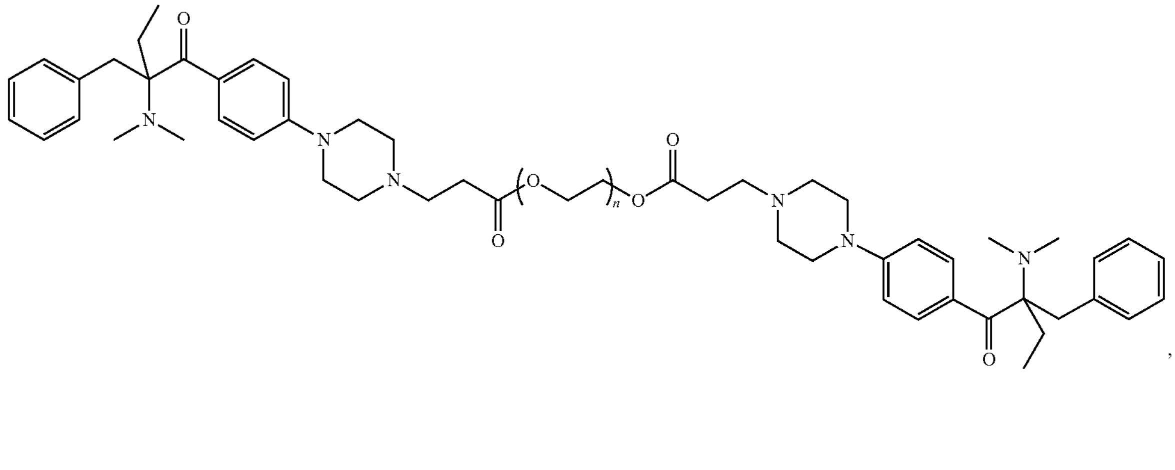

,

-continued
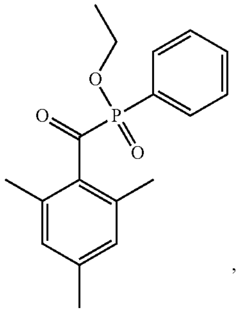
,
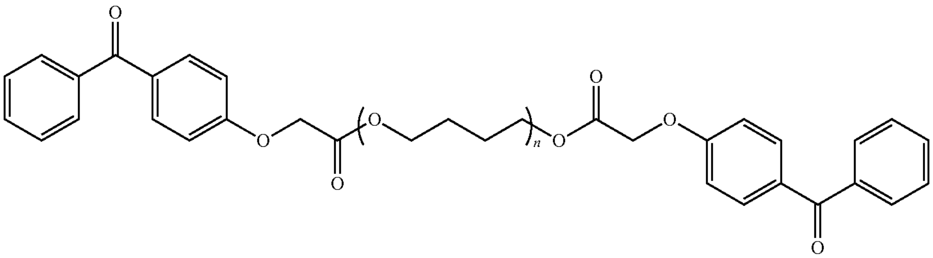
,
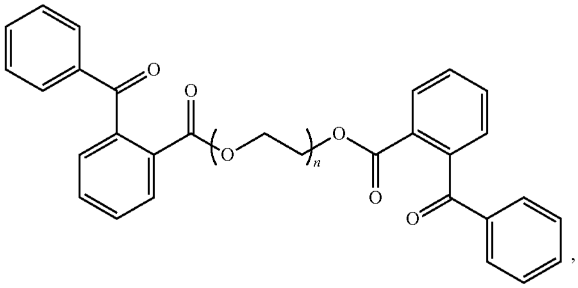
,
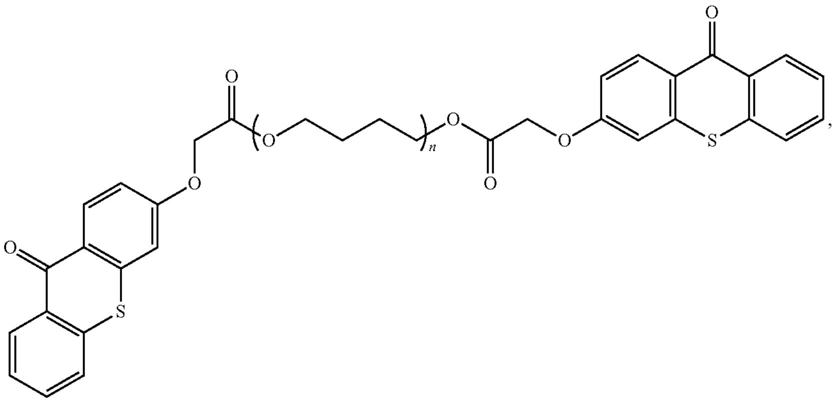
,
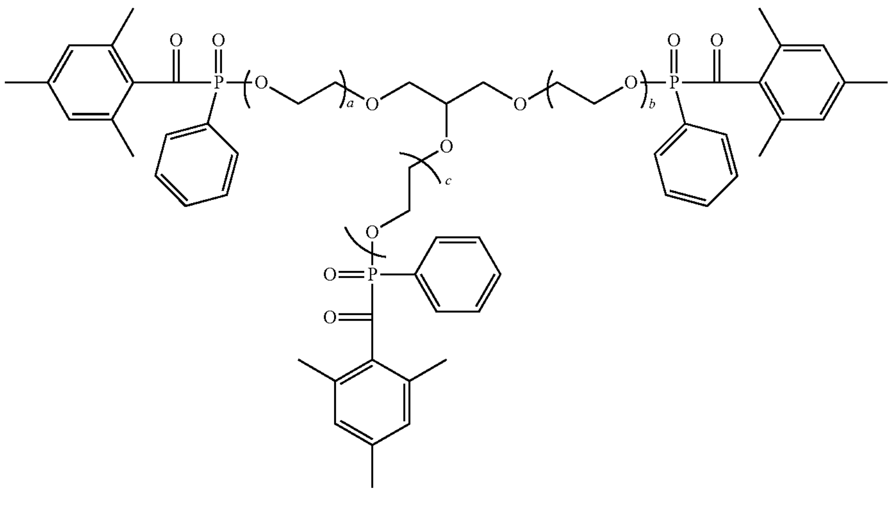

and mixtures thereof, wherein n is a value from 1 to 10 and a+b+c is a value from 1 to 20.

The monomers in combination with the photoinitiator package of the present invention therefore provide the ink with the desired water resistance, high cure speed and stability required for food packaging applications.

The Photoinitiator

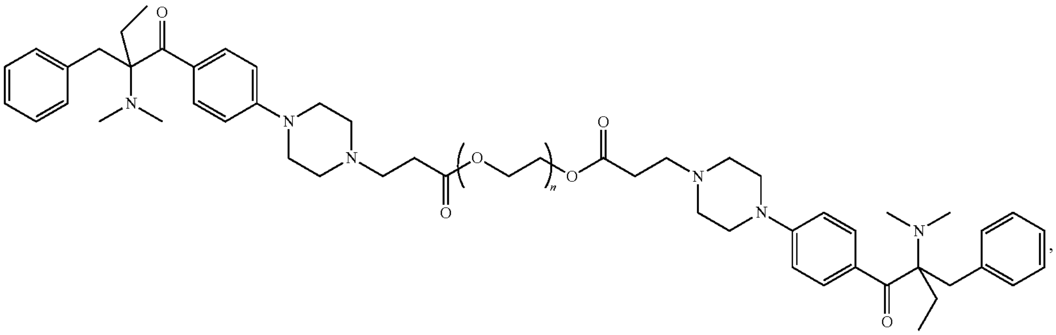

wherein n is a value from 1 to 10, is a piparazino based aminoalkylphenone. Preferably, n is a value from 1-5, more preferably 2-4. This photoinitiator is commercially available as Omnipol 910 from IGM with the CAS number 886463-10-1. It is also commercially available as Omnipol 9210 from IGM containing 80% Omnipol 910 in 20% pentaerythritol [5 EO] tetraacrylate (PPTTA).

The Photoinitiator

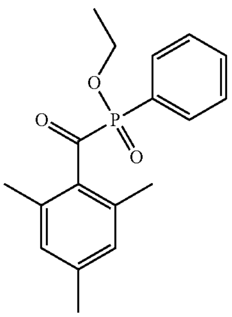 [SMILES: CCOP(=O)(C(=O)c1c(C)cc(C)cc1C)c1ccccc1]

has the chemical name ethyl phenyl(2,4,6-trimethylbenzoyl)phosphinate. It is commercially available as Omnirad TPO-L from IGM with the CAS number 84434-11-7.

The Photoinitiator

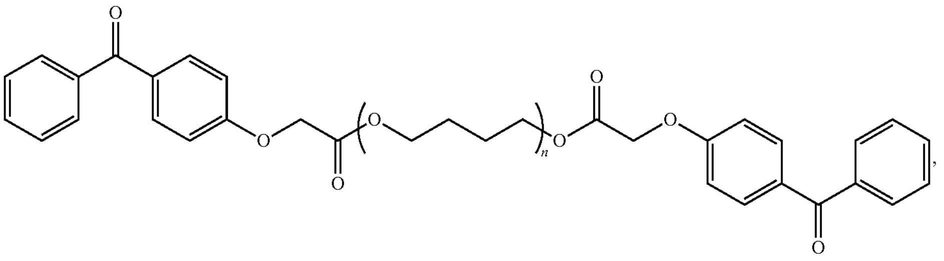

wherein n is a value from 1 to 10, is a photoinitiator having two benzophenone monomer units. Preferably, n is a value from 2 to 8, more preferably 3 to 6. This photoinitiator is commercially available as Omnipol BP from IGM with CAS number 515136-48-8.

The Photoinitiator

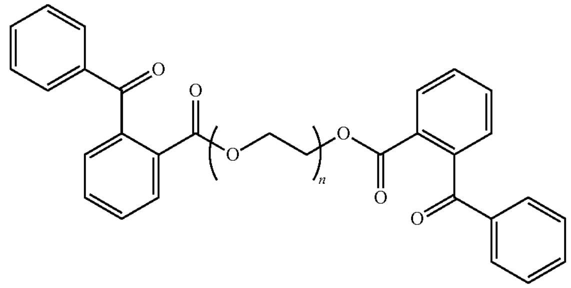

wherein n is a value from 1 to 10, is also a photoinitiator having two benzophenone monomer units. Preferably, n is a value from 2 to 8, more preferably 3 to 6. This photoinitiator is commercially available as Omnipol 2702 from IGM with CAS number 1246194-73-9.

The Photoinitiator

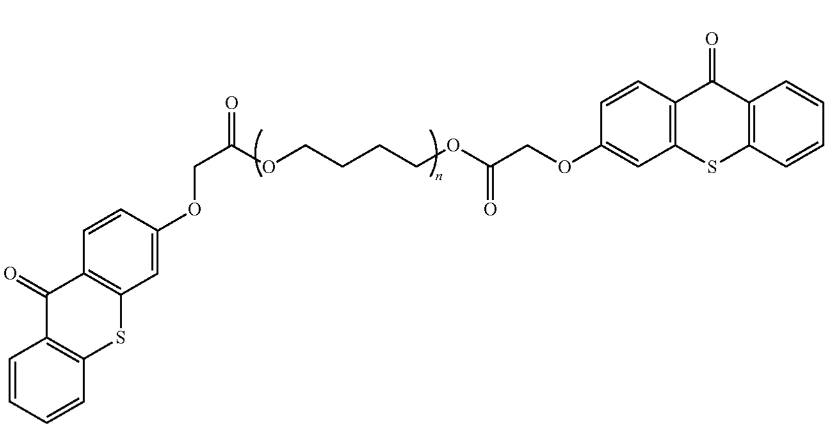

wherein n is a value from 1 to 10, is a photoinitiator having two repeating thioxanthone monomer units. It is commercially available as Omnipol TX from IGM with CAS number 813452-37-8.

The Photoinitiator

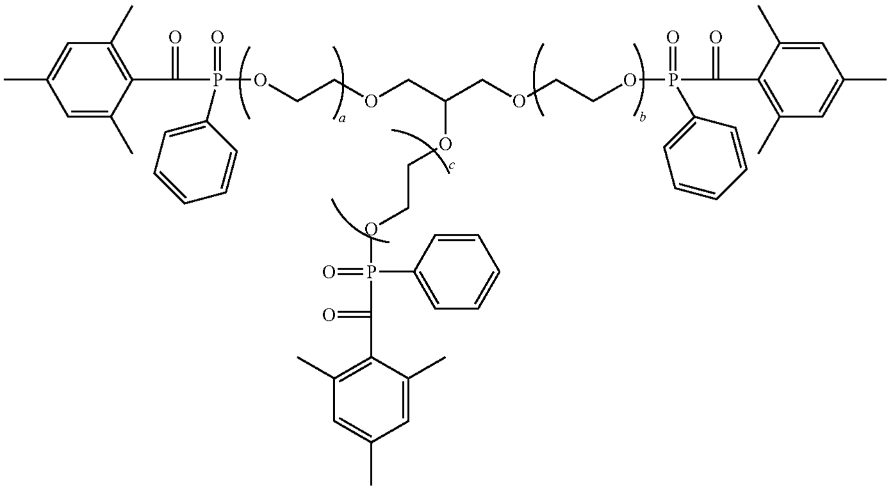

wherein a+b+c is a value from 1 to 20, has the chemical name polymeric ethyl (2,4,6-trimethylbenzoyl)-phenyl phosphinate and is known as polymeric TPO-L. This photoinitiator is commercially available as Omnipol TP from IGM with CAS number 1834525-17-5.

The total value of a, b and c in the chemical formula of polymeric TPO-L is equal to 1 to 20.

Preferably, the one or more photoinitiators selected from Omnipol 910, Omnirad TPO-L, Omnipol BP, Omnipol 2702, Omnipol TX, Omnipol TP and mixtures thereof comprise Omnipol 910. Put another way, the ink preferably comprises Omnipol 910.

In a preferred embodiment, the one or more photoinitiators selected from Omnipol 910, Omnirad TPO-L, Omnipol BP, Omnipol 2702, Omnipol TX, Omnipol TP and mixtures thereof are present in the ink in 1-10% by weight, more preferably 1-5% by weight, and most preferably 2-4% by weight, based on the total weight of the ink.

In another preferred embodiment, the photoinitiator package comprises one or more additional photoinitiators. By an additional photoinitiator is meant a photoinitiator other than Omnipol 910, Omnirad TPO-L, Omnipol BP, Omnipol 2702, Omnipol TX, Omnipol TP and other than a photoinitiator having a log $P_{octanol/water}$ value of less than 4.0. Accordingly, the one or more additional photoinitiators are distinct from Omnipol 910, Omnirad TPO-L, Omnipol BP, Omnipol 2702, Omnipol TX, Omnipol TP and the one or more photoinitiators each having a log $P_{octanol/water}$ value of less than 4.0. Otherwise, the one or more additional photoinitiators are not particularly limited.

Preferred one or more additional photoinitiators are photoinitiators which produce free radicals on irradiation (free radical photoinitiators) such as, for example, benzophenone, 1-hydroxycyclohexyl phenyl ketone, 2-benzyl-2-dimethylamino-(4-morpholinophenyl)butan-1-one, benzil dimethylketal, phenylbis(2,4,6-trimethylbenzoyl) phosphine oxide or mixtures thereof. Such photoinitiators are known and commercially available such as, for example, under the trade names Omnirad (from IGM) and Esacure (from Lamberti).

In a preferred embodiment, the one or more additional photoinitiators are selected from

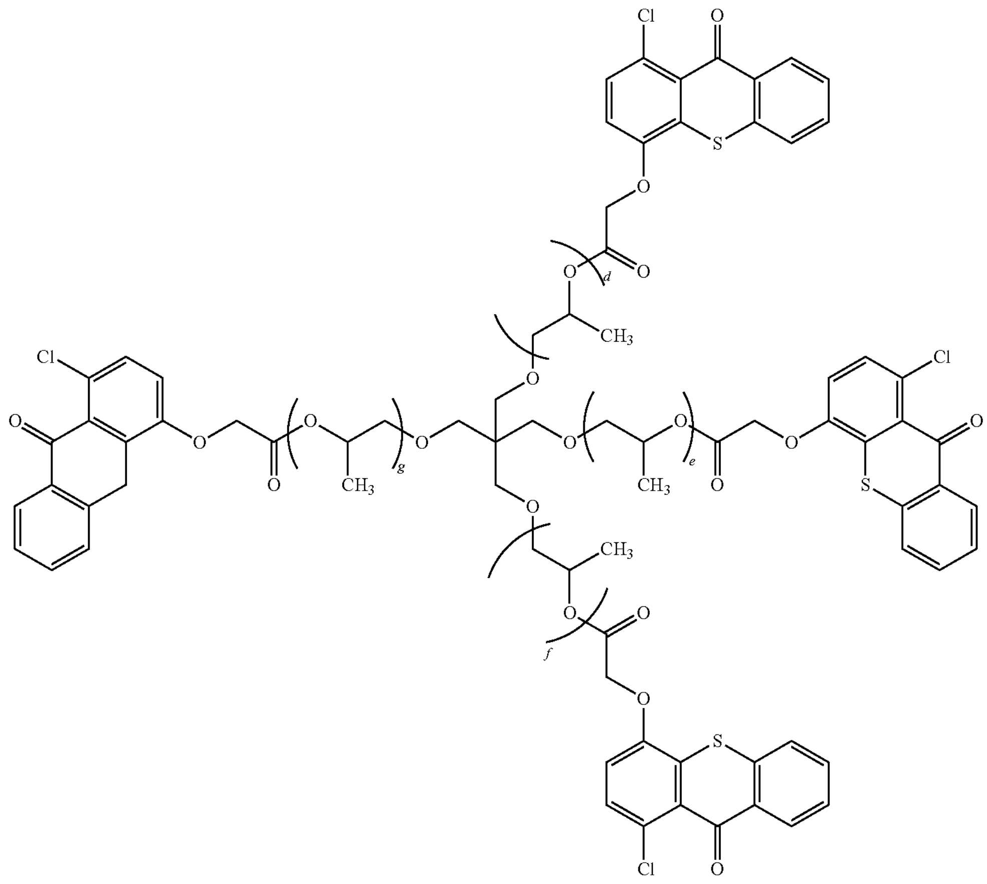
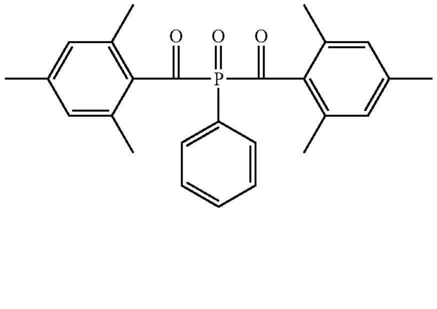

and mixtures thereof, wherein d+e+f+g is a value from 1 to 20.

The Photoinitiator

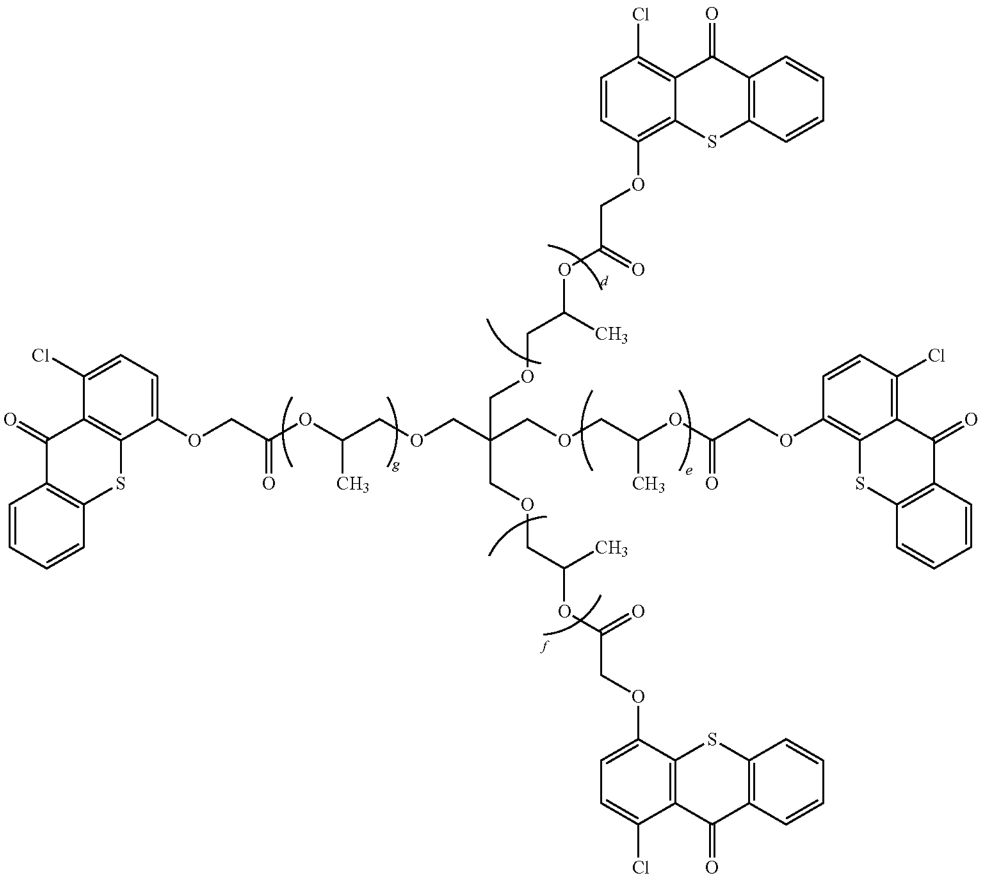

wherein d+e+f+g is a value from 1 to 20, is 1,3-di({α-[1-chloro-9-oxo-9H-thioxanthen-4-yl)oxy]acetylpoly[oxy(1-methylethylene)]} oxy)-2,2-bis({α-[1-chloro-9-oxo-9H-thioxanthen-4-yl)oxy]acetylpoly[oxy(1-methylethylene)]}oxymethyl) propane and is known as polymeric ITX. This photoinitiator is commercially available as Speedcure 7010L from Lambson containing a solution of polymeric ITX in trimethylolpropane ethoxylate triacrylate.

Polymeric ITX has the CAS number 1003567-83-6 and trimethylolpropane ethoxylate triacrylate has the CAS number 28961-43-5.

The total value of d, e, f and g in the chemical formula of polymeric ITX is equal to 1 to 20. In a preferred embodiment, the value of d+e+f+g in the chemical formula of polymeric ITX is equal to 1 to 15.

The Photoinitiator

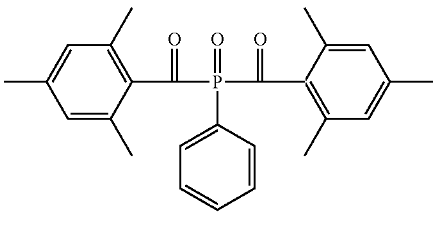

is phenyl bis(2,4,6-trimethylbenzoyl)-phosphine oxide. It is commercially available as Omnirad 819 from IGM with CAS number 162881-26-7.

Preferably, the photoinitiator package of the ink of the present invention further comprises one or more additional photoinitiators, more preferably two or more additional photoinitiators. More preferably, the photoinitiator package of the ink of the present invention further comprises Speedcure 7010L and Omnirad 819.

In a preferred embodiment, the photoinitiator package of the ink of the present invention contains up to five photoinitiators including one or more photoinitiators having a log $P_{octanol/water}$ value of less than 4.0 and one or more photoinitiators selected from Omnipol 910, Omnirad TPO-L, Omnipol BP, Omnipol 2702, Omnipol TX, Omnipol TP and mixtures thereof.

In a particularly preferred embodiment, the photoinitiator package of the ink of the present invention comprises Esacure KIP 160, Omnipol 910, Speedcure 7010L and Omnirad 819.

In a preferred embodiment, the photoinitiator package is present in the ink in 10-30% by weight, more preferably 15-20% by weight, based on the total weight of the ink.

For food packaging applications, there is some concern about the negative odour/taint, migration potential and/or safety of the photoinitiators 2-hydroxy 2-methyl propiophenone, 2-(dimethylamino)ethyl benzoate, benzophenone, 2-methyl benzophenone, 4-methyl benzophenone, 2,4,6-trimethyl benzophenone, 1-hydroxycyclohexyl phenyl ketone, 2,2-dimethoxy 2-phenyl acetophenone, 2-methyl 4'-(methylthio) 2-morpholino-propiophenone, 2-isopropyl 9H-thioxanthen-9-one (2-ITX), 4-isopropyl 9H-thioxanthen-9-one (4-ITX), 2,4-diethyl 9H-thioxanthen-9-one and diphenyl (2,4,6-trimethyl benzoyl) phosphine oxide.

Therefore, in a preferred embodiment, the ink preferably contains less than 5% by weight, more preferably less than 2% by weight, more preferably less than 1% by weight, most preferably is substantially free of each of 2-hydroxy 2-methyl propiophenone, 2-(dimethylamino)ethyl benzoate, benzophenone, 2-methyl benzophenone, 4-methyl benzophenone, 2,4,6-trimethyl benzophenone, 1-hydroxycyclohexyl phenyl ketone, 2,2-dimethoxy 2-phenyl acetophenone, 2-methyl 4'-(methylthio) 2-morpholino-propiophenone, 2-isopropyl 9H-thioxanthen-9-one (2-ITX), 4-isopropyl 9H-thioxanthen-9-one (4-ITX), 2,4-diethyl 9H-thioxanthen-9-one and diphenyl (2,4,6-trimethyl benzoyl) phosphine oxide, where the amounts are based on the total weight of the ink.

By substantially free is meant that only small amounts will be present, for example as impurities in the radiation-curable materials present or as a component in a commercially available pigment dispersion. In other words, no 2-hydroxy 2-methyl propiophenone, 2-(dimethylamino) ethyl benzoate, benzophenone, 2-methyl benzophenone, 4-methyl benzophenone, 2,4,6-trimethyl benzophenone, 1-hydroxycyclohexyl phenyl ketone, 2,2-dimethoxy 2-phenyl acetophenone, 2-methyl 4'-(methylthio) 2-morpholino-propiophenone, 2-isopropyl 9H-thioxanthen-9-one (2-ITX), 4-isopropyl 9H-thioxanthen-9-one (4-ITX), 2,4-diethyl 9H-thioxanthen-9-one and diphenyl (2,4,6-trimethyl benzoyl) phosphine oxide is intentionally added to the ink. However, minor amounts of each of 2-hydroxy 2-methyl propiophenone, 2-(dimethylamino)ethyl benzoate, benzophenone, 2-methyl benzophenone, 4-methyl benzophenone, 2,4,6-trimethyl benzophenone, 1-hydroxycyclohexyl phenyl ketone, 2,2-dimethoxy 2-phenyl acetophenone, 2-methyl 4'-(methylthio) 2-morpholino-propiophenone, 2-isopropyl 9H-thioxanthen-9-one (2-ITX), 4-isopropyl 9H-thioxanthen-9-one (4-ITX), 2,4-diethyl 9H-thioxanthen-9-one and diphenyl (2,4,6-trimethyl benzoyl) phosphine oxide, which may be present as impurities in commercially available inkjet ink components, are tolerated. For example, the ink may comprise less than 0.5% by weight, more preferably less than 0.1% by weight, most preferably less than 0.05% by weight of each of 2-hydroxy 2-methyl propiophenone, 2-(dimethylamino)ethyl benzoate, benzophenone, 2-methyl benzophenone, 4-methyl benzophenone, 2,4,6-trimethyl benzophenone, 1-hydroxycyclohexyl phenyl ketone, 2,2-dimethoxy 2-phenyl acetophenone, 2-methyl 4'-(methylthio) 2-morpholino-propiophenone, 2-isopropyl 9H-thioxanthen-9-one (2-ITX), 4-isopropyl 9H-thioxanthen-9-one (4-ITX), 2,4-diethyl 9H-thioxanthen-9-one and diphenyl (2,4,6-trimethyl benzoyl) phosphine oxide, based on the total weight of the ink. In a preferred embodiment, the inkjet ink is free of each of 2-hydroxy 2-methyl propiophenone, 2-(dimethylamino)ethyl benzoate, benzophenone, 2-methyl benzophenone, 4-methyl benzophenone, 2,4,6-trimethyl benzophenone, 1-hydroxycyclohexyl phenyl ketone, 2,2-dimethoxy 2-phenyl acetophenone, 2-methyl 4'-(methylthio) 2-morpholino-propiophenone, 2-isopropyl 9H-thioxanthen-9-one (2-ITX), 4-isopropyl 9H-thioxanthen-9-one (4-ITX), 2,4-diethyl 9H-thioxanthen-9-one and diphenyl (2,4,6-trimethyl benzoyl) phosphine oxide.

More preferably, the ink contains less than 5% by weight, more preferably less than 2% by weight, more preferably less than 1% by weight, most preferably is substantially free of 2-hydroxy 2-methyl propiophenone, 2-(dimethylamino) ethyl benzoate, benzophenone, 2-methyl benzophenone, 4-methyl benzophenone, 2,4,6-trimethyl benzophenone, 1-hydroxycyclohexyl phenyl ketone, 2,2-dimethoxy 2-phenyl acetophenone, 2-methyl 4'-(methylthio) 2-morpholino-propiophenone, 2-isopropyl 9H-thioxanthen-9-one (2-ITX), 4-isopropyl 9H-thioxanthen-9-one (4-ITX), 2,4-diethyl 9H-thioxanthen-9-one and diphenyl (2,4,6-trimethyl benzoyl) phosphine oxide in combination, where the amounts are based on the total weight of the ink.

By substantially free is meant that only small amounts will be present, for example as impurities in the radiation-curable materials present or as a component in a commercially available pigment dispersion. In other words, no 2-hydroxy 2-methyl propiophenone, 2-(dimethylamino) ethyl benzoate, benzophenone, 2-methyl benzophenone, 4-methyl benzophenone, 2,4,6-trimethyl benzophenone, 1-hydroxycyclohexyl phenyl ketone, 2,2-dimethoxy 2-phenyl acetophenone, 2-methyl 4'-(methylthio) 2-morpholino-propiophenone, 2-isopropyl 9H-thioxanthen-9-one (2-ITX), 4-isopropyl 9H-thioxanthen-9-one (4-ITX), 2,4-diethyl 9H-thioxanthen-9-one and diphenyl (2,4,6-trimethyl benzoyl) phosphine oxide is intentionally added to the ink. However, minor amounts of 2-hydroxy 2-methyl propiophenone, 2-(dimethylamino)ethyl benzoate, benzophenone, 2-methyl benzophenone, 4-methyl benzophenone, 2,4,6-trimethyl benzophenone, 1-hydroxycyclohexyl phenyl ketone, 2,2-dimethoxy 2-phenyl acetophenone, 2-methyl 4'-(methylthio) 2-morpholino-propiophenone, 2-isopropyl 9H-thioxanthen-9-one (2-ITX), 4-isopropyl 9H-thioxanthen-9-one (4-ITX), 2,4-diethyl 9H-thioxanthen-9-one and diphenyl (2,4,6-trimethyl benzoyl) phosphine oxide in combination, which may be present as impurities in commercially available inkjet ink components, are tolerated. For example, the ink may comprise less than 0.5% by weight, more preferably less than 0.1% by weight, most preferably less than 0.05% by weight of 2-hydroxy 2-methyl propiophenone, 2-(dimethylamino)ethyl benzoate, benzophenone, 2-methyl benzophenone, 4-methyl benzophenone, 2,4,6-trimethyl benzophenone, 1-hydroxycyclohexyl phenyl ketone, 2,2-dimethoxy 2-phenyl acetophenone, 2-methyl 4'-(methylthio) 2-morpholino-propiophenone, 2-isopropyl 9H-thioxanthen-9-one (2-ITX), 4-isopropyl 9H-thioxanthen-9-one (4-ITX), 2,4-diethyl 9H-thioxanthen-9-one and diphenyl (2,4,6-trimethyl benzoyl) phosphine oxide in combination, based on the total weight of the ink. In a preferred embodiment, the inkjet ink is free of 2-hydroxy 2-methyl propiophenone, 2-(dimethylamino)ethyl benzoate, benzophenone, 2-methyl benzophenone, 4-methyl benzophenone, 2,4,6-trimethyl benzophenone, 1-hydroxycyclohexyl phenyl ketone, 2,2-dimethoxy 2-phenyl acetophenone, 2-methyl 4'-(methylthio) 2-morpholino-propiophenone, 2-isopropyl 9H-thioxanthen-9-one (2-ITX), 4-isopropyl 9H-thioxanthen-9-one (4-ITX), 2,4-diethyl 9H-thioxanthen-9-one and diphenyl (2,4,6-trimethyl benzoyl) phosphine oxide.

In a preferred embodiment, the inkjet ink of the present invention may further comprise a radiation-curable (i.e. polymerisable) oligomer, such as a (meth)acrylate oligomer. Any radiation-curable oligomer that is compatible with the other ink components is suitable for use in the ink.

The term "curable oligomer" has its standard meaning in the art, namely that the component is partially reacted to form a pre-polymer having a plurality of repeating monomer units, which is capable of further polymerisation. The oligomer preferably has a molecular weight of at least 600. The molecular weight is preferably 4,000 or less. Molecular weights (number average) can be calculated if the structure of the oligomer is known or molecular weights can be measured using gel permeation chromatography using polystyrene standards.

The oligomers may possess different degrees of functionality, and a mixture including combinations of mono, di, tri and higher functionality oligomers may be used. The degree of functionality of the oligomer determines the degree of crosslinking and hence the properties of the cured ink. The oligomer is preferably multifunctional meaning that it contains on average more than one reactive functional group per molecule. The average degree of functionality is preferably from 2 to 6.

Oligomers are typically added to inkjet inks to increase the viscosity of the inkjet ink or to provide film-forming properties such as hardness or cure speed. They therefore preferably have a viscosity of 150 mPas or above at 25° C. Preferred oligomers for inclusion in the ink of the invention have a viscosity of 0.5 to 10 Pas at 50° C. Oligomer viscosities can be measured using an ARG2 rheometer manufactured by T.A. Instruments, which uses a 40 mm oblique/2° steel cone at 60° C. with a shear rate of 25 $s^{-1}$.

Radiation-curable oligomers comprise a backbone, for example a polyester, urethane, epoxy or polyether backbone, and one or more radiation-curable groups. The oligomer preferably comprises a polyester, urethane or a polyester-based urethane backbone.

The polymerisable group can be any group that is capable of polymerising upon exposure to radiation. Preferably the oligomers are (meth)acrylate oligomers. The oligomer may include amine functionality, as the amine acts as an activator without the drawback of migration associated with low-molecular weight amines. In a preferred embodiment, the radiation-curable oligomer is amine modified. In a particularly preferred embodiment, the radiation-curable oligomer is an amine-modified (meth)acrylate oligomer.

Particularly preferred radiation-curable oligomers are di-, tri-, tetra-, penta- or hexa-functional acrylates.

Other suitable examples of radiation-curable oligomers include epoxy based materials such as bisphenol A epoxy acrylates and epoxy novolac acrylates, which have fast cure speeds and provide cured films with good solvent resistance. However, in the present invention, the ink preferably contains less than 5% by weight, more preferably less than 2% by weight, more preferably less than 1% by weight, and more preferably is substantially free of bisphenol A epoxy acrylates, where the amounts are based on the total weight of the ink.

By substantially free is meant that only small amounts will be present, for example as impurities in the radiation-curable materials present or as a component in a commercially available pigment dispersion. In other words, no bisphenol A epoxy acrylates is intentionally added to the ink. However, minor amounts of bisphenol A epoxy acrylates, which may be present as impurities in commercially available inkjet ink components, are tolerated. For example, the ink may comprise less than 0.5% by weight of bisphenol A epoxy acrylates, more preferably less than 0.1% by weight of bisphenol A epoxy acrylates, most preferably less than 0.05% by weight of bisphenol A epoxy acrylates, based on the total weight of the ink. In a preferred embodiment, the inkjet ink is free of bisphenol A epoxy acrylates.

The amount of radiation-curable oligomer, when present, is preferably 0.1-10% by weight, based on the total weight of the ink.

The ink may also contain a resin. The resin preferably has a weight-average molecular weight (Mw) of 10-50 KDa, and most preferably 15-35 KDa. The Mw may be measured by known techniques in the art, such as gel permeation chromatography (GPC), using a polystyrene standard. The resin is preferably solid at 25° C. It is preferably soluble in the liquid medium of the ink (the radiation-curable diluent and, when present, additionally the solvent).

The resin is a passive (i.e. inert) resin, in the sense that it is not radiation curable and hence does not undergo crosslinking under the curing conditions to which the ink is subjected.

The resin may improve adhesion of the ink to the substrate. It is preferably soluble in the ink. The resin, when present, is preferably present at 0.1-5% by weight, based on the total weight of the ink.

In a preferred embodiment, the inkjet ink of the present invention also includes a colouring agent, which may be either dissolved or dispersed in the liquid medium of the ink. The colouring agent can be any of a wide range of suitable colouring agents that would be known to the person skilled in the art.

Preferably, the colouring agent is a dispersed pigment, of the types known in the art and commercially available such as under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used.

In one aspect the following pigments are preferred. Cyan: phthalocyanine pigments such as Phthalocyanine blue 15.4. Yellow: azo pigments such as Pigment yellow 120, Pigment yellow 151 and Pigment yellow 155. Magenta: quinacridone pigments, such as Pigment violet 19 or mixed crystal quinacridones such as Cromophtal Jet magenta 2BC and Cinquasia RT-355D. Black: carbon black pigments such as Pigment black 7.

Pigment particles dispersed in the ink should be sufficiently small to allow the ink to pass through an inkjet nozzle, typically having a particle size less than 8 μm, preferably less than 5 μm, more preferably less than 1 μm and particularly preferably less than 0.5 μm.

The colorant is preferably present in an amount of 0.2-20% by weight, preferably 0.5-15% by weight, based on the total weight of the ink. A higher concentration of pigment may be required for white inks, for example up to and including 30% by weight, or 25% by weight, based on the total weight of the ink.

In a preferred embodiment the radiation-curable material polymerises by free-radical polymerisation.

The inkjet ink preferably dries primarily by curing, i.e. by the polymerisation of the monomers present, as discussed hereinabove, and hence is a curable ink. The ink does not, therefore, require the presence of water or a volatile organic solvent to effect drying of the ink. Preferably, the inkjet ink comprises less than 5% by weight of water and volatile organic solvent combined, preferably less than 3% by weight combined, more preferably, less than 2% by weight combined and more preferably less than 1% by weight combined, and most preferably, the inkjet ink is substantially free of water and volatile organic solvents, where the amounts are based on the total weight of the ink.

By substantially free is meant that only small amounts will be present, for example some water will typically be absorbed by the ink from the air and solvents may be present as impurities in the components of the inks, but such low levels are tolerated. In other words, no water or a volatile organic solvent is intentionally added to the ink. However, minor amounts of water or a volatile organic solvent, which may be present as impurities in commercially available inkjet ink components, are tolerated. For example, the ink may comprise less than 0.5% by weight of water or a volatile organic solvent, more preferably less than 0.1% by weight of water or a volatile organic solvent, most preferably less than 0.05% by weight of water or a volatile organic solvent, based on the total weight of the ink. In a preferred embodiment, the inkjet ink is free of water or a volatile organic solvent.

In a preferred embodiment, the inkjet ink comprises a surfactant. The surfactant controls the surface tension of the ink. Surfactants are well known in the art and a detailed description is not required. An example of a suitable surfactant is BYK307. Adjustment of the surface tension of the inks allows control of the surface wetting of the inks on various substrates, for example, plastic substrates. Too high a surface tension can lead to ink pooling and/or a mottled appearance in high coverage areas of the print. Too low a surface tension can lead to excessive ink bleed between different coloured inks. Surface tension is also critical to ensuring stable jetting (nozzle plate wetting and sustainability). The surface tension is preferably in the range of 18-40 $mNm^{-1}$, more preferably 20-35 $mNm^{-1}$ and most preferably 20-30 $mNm^{-1}$.

Other components of types known in the art may be present in the ink of the present invention to improve the properties or performance. These components may be, for example, additional surfactants, defoamers, dispersants, synergists, stabilisers against deterioration by heat or light other than an aerobic stabiliser, reodorants, flow or slip aids, biocides and identifying tracers.

The amounts by weight provided herein are based on the total weight of the ink.

The ink or inkjet ink sets may be prepared by known methods such as stirring with a high-speed water-cooled stirrer, or milling on a horizontal bead-mill.

The ink exhibits a desirable low viscosity, less than 100 mPas, preferably 50 mPas or less, more preferably 30 mPas or less and most preferably 20 mPas or less at 25° C. The ink most preferably has a viscosity of 8 to 20 mPas at 25° C. Viscosity may be measured using a digital Brookfield viscometer fitted with a thermostatically controlled cup and spindle arrangement, such as model DV1.

The present invention also provides an inkjet ink set, wherein the inkjet ink set of the invention has at least one ink that falls within the scope of the inkjet ink according to the present invention. Preferably, all of the inks in the set fall within the scope of the inkjet ink according to the present invention.

Usually, the inkjet ink set of the present invention is in the form of a multi-chromatic inkjet ink set, which typically comprises a cyan ink, a magenta ink, a yellow ink and a black ink (a so-called trichromatic set). This set is often termed CMYK. The inks in a trichromatic set can be used to produce a wide range of colours and tones.

The present invention also provides a method of inkjet printing comprising inkjet printing the inkjet ink as defined herein onto a substrate and curing the inkjet ink by exposing the inkjet ink to a curing source.

In the method of inkjet printing of the present invention, the inkjet ink is inkjet printed onto a substrate. Printing is performed by inkjet printing, e.g. on a single-pass inkjet printer, for example for printing (directly) onto a substrate, on a roll-to-roll printer or a flat-bed printer. As discussed above, inkjet printing is well known in the art and a detailed description is not required.

The ink is jetted from one or more reservoirs or printing heads through narrow nozzles on to a substrate to form a printed image.

Print heads account for a significant portion of the cost of an entry level printer and it is therefore desirable to keep the number of print heads (and therefore the number of inks in the ink set) low. Reducing the number of print heads can reduce print quality and productivity. It is therefore desirable to balance the number of print heads in order to minimise cost without compromising print quality and productivity.

Substrates include those for packaging applications and in particular, flexible packaging applications. Examples include substrates composed of polyvinyl chloride (PVC), polystyrene, polyester, polyethylene terephthalate (PET), polyethylene terephthalate glycol modified (PETG) and polyolefin (e.g. polyethylene, polypropylene or mixtures or copolymers thereof). Further substrates include all cellulosic materials such as paper and board, or their mixtures/blends with the aforementioned synthetic materials.

Particularly preferred substrates are a food packaging. Food packaging is typically formed of flexible and rigid plastics (e.g. food-grade polystyrene and PE/PP films), paper and board (e.g. corrugated board). Printing onto a food packaging substrate represents a particular challenge on account of the strict safety limitations on the properties of materials which come into contact with food, including indirect additives like packaging inks. For printed food packaging, it is necessary to control and quantify the migration and/or odour of the components of the printed image on the food packaging into the food products. Specific exclusions based on their odour and/or migration properties include volatile organic solvents and many monomers typically used in UV curing inks. Preferably, the monomers present in the ink of the present invention are suitable for food packaging applications.

When discussing the substrate, it is the surface which is most important, since it is the surface which is wetted by the ink. Thus, at least the surface of substrate is composed of the above-discussed material.

In a preferred embodiment, the substrate is a laminate carton material comprising the following layers, in order: an inner polyethylene layer; an aluminium layer; a board layer; and an outer polyethylene layer. By inner is meant a surface of the substrate that would come into contact with food and by outer is meant a surface of the substrate that would come into contact with the inkjet ink used in the method of the present invention. More preferably, the polyethylene layer is corona treated to a surface tension of more than 45 dynes/cm using a Vetaphone unit. This provides improved adhesion of the ink.

The present invention may also provide a printed substrate having the ink as defined herein printed thereon. Preferably, the substrate is a food packaging.

In order to produce a high quality printed image a small jetted drop size is desirable. Preferably the inkjet ink is jetted at drop sizes below 90 picolitres, preferably below 35 picolitres and most preferably below 10 picolitres.

To achieve compatibility with print heads that are capable of jetting drop sizes of 90 picolitres or less, a low viscosity ink is required. A viscosity of 30 mPas or less at 25° C. is preferred, for example, 8 to 12 mPas, 18 to 20 mPas, or 24 to 26 mPas. Ink viscosity may be measured using a Brookfield viscometer fitted with a thermostatically controlled cup and spindle arrangement, such as a DV1 low-viscosity viscometer running at 20 rpm at 25° C. with spindle 00.

The ink of the present invention is cured by any means known in the art, such as exposure to actinic radiation and low-energy electron beam radiation.

It should be noted that the terms "dry" and "cure" are often used interchangeably in the art when referring to radiation-curable inkjet inks to mean the conversion of the inkjet ink from a liquid to solid by polymerisation and/or crosslinking of the radiation-curable material. Herein, however, by "drying" is meant the removal of the water by evaporation and by "curing" is meant the polymerisation and/or crosslinking of the radiation-curable material. Further details of the printing, drying and curing process are provided in WO 2011/021052.

In a preferred embodiment, the ink is cured by exposing the printed ink to a source of actinic radiation.

The source of actinic radiation can be any source of actinic radiation that is suitable for curing radiation-curable inks but is preferably a UV source. Suitable UV sources are well known in the art and a detailed description is not required. These include mercury discharge lamps, fluorescent tubes, light emitting diodes (LEDs), flash lamps and combinations thereof. One or more mercury discharge lamps, fluorescent tubes, or flash lamps may be used as the radiation source.

Preferably, the source of actinic radiation is a mercury discharge lamp and/or LEDs. When LEDs are used, these are preferably provided as an array of multiple LEDs.

The most common UV light source used to cure inkjet inks is a mercury discharge lamp. These lamps operate by creating a plasma between two electrodes in a high pressure mercury gas contained in a quartz envelope. Although these lamps have some drawbacks in terms of their operational characteristics, no other UV light source has yet managed to challenge their position in terms of UV output performance.

LEDs are increasingly used to cure inkjet inks. UV light is emitted from a UV LED light source. UV LED light sources comprise one or more LEDs and are well known in the art. Thus, a detailed description is not required.

It will be understood that UV LED light sources emit radiation having a spread of wavelengths. The emission of UV LED light sources is identified by the wavelength which corresponds to the peak in the wavelength distribution. Compared to conventional mercury lamp UV sources, UV LED light sources emit UV radiation over a narrow range of wavelengths on the wavelength distribution. The width of the range of wavelengths on the wavelength distribution is called a wavelength band. LEDs therefore have a narrow wavelength output when compared to other sources of UV radiation. By a narrow wavelength band, it is meant that at least 90%, preferably at least 95%, of the radiation emitted from the UV LED light source has a wavelength within a wavelength band having a width of 50 nm or less, preferably, 30 nm or less, most preferably 15 nm or less.

In a preferred embodiment, at least 90%, preferably at least 95%, of the radiation emitted from the UV LED light source has a wavelength in a band having a width of 50 nm or less, preferably 30 nm or less, most preferably 15 nm or less.

LEDs have a longer lifetime and exhibit no change in the power/wavelength output overtime. LEDs also have the advantage of switching on instantaneously with no thermal stabilisation time and their use results in minimal heating of the substrate.

In a preferred embodiment, the ink is cured by exposing the printed ink to low-energy electron beam (ebeam).

The source of low-energy electron beam (ebeam) can be any source of low-energy electron beam that is suitable for curing radiation-curable inks. Suitable low-energy electron beam radiation sources include commercially available ebeam curing units, such as the EB Lab from ebeam Technologies with energy of 80-300 keV and capable of delivering a typical dose of 30-50 kGy at line speeds of up to 30 m/min. By "low-energy" for the ebeam, it is meant that it delivers an electron beam having a dose at the substrate of 100 kGy or less, preferably 70 kGy or less.

Ebeam curing is characterised by dose (energy per unit mass, measured in kilograys (kGy)) deposited in the substrate via electrons. Electron beam surface penetration depends upon the mass, density and thickness of the material being cured. Compared with UV penetration, electrons penetrate deeply through both lower and higher density materials. Unlike UV curing, photoinitiators are not required for ebeam curing to take place.

Ebeam curing is well-known in the art and therefore a detailed explanation of the curing method is not required. In order to cure the printed ink, the ink of the invention is exposed to the ebeam, which produces sufficient energy to instantaneously break chemical bonds and enable polymerisation or crosslinking.

There is no restriction on the ebeam dose that is used to cure the inkjet inks of the present invention other than that the dose is sufficient to fully cure the ink. Preferably, the dose is more than 10 kGy, more preferably more than 20 kGy, more preferably more than 30 kGy and most preferably more than 40 kGy. Preferably, the dose is less than 100 kGy, more preferably less than 90 kGy, more preferably less than 80 kGy and most preferably less than 70 kGy. Preferably, the dose is more than 30 kGy but less than 70 kGy, more preferably more than 30 kGy but less than 60 kGy and most preferably, more than 30 kGy but 50 kGy or less. Doses above 50 kGy may cause damage to the substrate, particularly the substrates used for food packaging applications, and so doses of 50 kGy or less are preferred.

The energy associated with these doses is 80-300 keV, more preferably 70-200 keV and most preferably 100 keV.

In a preferred embodiment, the inkjet ink is initially partially cured (i.e. pinned) by exposure to a first curing source, followed by full cure by exposure to a second curing source. Preferably therefore, the method of the present invention comprises inkjet printing the inkjet ink of the present invention onto a substrate, and curing the inkjet ink by exposing the inkjet ink to a curing source, wherein curing the inkjet ink by exposing the inkjet ink to a curing source comprises the following steps in order: (i) partially curing the inkjet ink by exposing the inkjet ink to a first curing source; and (ii) fully curing the inkjet ink by exposing the inkjet ink to a second curing source.

The first and second curing source can be any curing source known in the art. Preferably, the first curing source for partially curing the inkjet ink is a UV LED lamp and the second curing source for fully curing the inkjet ink is a source of low-energy electron beam radiation.

By partial curing of the inkjet ink, it is meant that on exposure to a first curing source, partial curing of the ink below the surface of the printed film is achieved, which causes the ink to "set" on the substrate. This step is also known as "pinning". Without wishing to be bound by theory, it is believed that the first curing source penetrates the ink and partial cure of the ink throughout the printed film can be achieved. However, the surface of the film remains tacky after partial curing, often owing to the inhibiting effect of oxygen in the atmosphere adjacent to the printed ink surface.

A second curing step comprising exposing the partially cured inkjet ink to a second curing source fully cures the inkjet ink by curing the ink film at the surface.

The ink cures to form a relatively thin polymerised film. The ink of the present invention typically produces a printed film having a thickness of 1 to 20 μm, preferably 1 to 10 μm, for example 2 to 5 μm. Film thicknesses can be measured using a confocal laser scanning microscope.

The invention will now be described with reference to the following examples, which are not intended to be limiting.

EXAMPLES

Example 1

Inkjet inks were prepared according to the formulations set out in Table 1. The inkjet ink formulations were prepared by mixing the components in the given amounts. Amounts are given as weight percentages based on the total weight of the ink.

TABLE 1

| Component | Ink 1 (invention) | Ink 2 (comparative) | Ink 3 (comparative) |
|---|---|---|---|
| 3-MPDDA (difunctional monomer) | 45.62 | 45.62 | 45.62 |
| DVE-3 (difunctional monomer) | 4.80 | 4.80 | 4.80 |
| Lauryl acrylate (mono-functional monomer) | 24.04 | 24.04 | 24.04 |
| Irgastab UV22 (stabiliser) | 0.20 | 0.20 | 0.20 |
| Cyan pigment dispersion | 7.84 | 7.84 | 7.84 |
| Omnirad 9210 (photoinitiator) | 3.00 | | |
| Speedcure 7010L (photoinitiator) | 6.50 | 8.00 | 9.50 |
| Esacure KIP 160 (photoinitiator) | 3.50 | 5.00 | 3.50 |
| Omnirad 819 (photoinitiator) | 3.50 | 3.50 | 3.50 |
| Byk 307 (surfactant) | 1.00 | 1.00 | 1.00 |
| Total | 100.00 | 100.00 | 100.00 |
| Viscosity at 25° C. (mPa · s) | 11.16 | 9.81 | 11.22 |
| UV dose required for cure before freezer storage ($mJ/cm^2$) | 525 | 525 | 871 |
| UV dose required for cure after freezer storage ($mJ/cm^2$) | 525 | 655 | 871 |
| Precipitated photo-initiator after freezer storage? | No | Yes | No |

3-MPDDA, DVE-3 and lauryl acrylate are monomers, as defined herein. Lauryl acrylate is the only monomer present that has a log $P_{octanol/water}$ value of 5.0 or more, namely 5.8.

The cyan pigment dispersion A contains 30% pigment, 20% polymeric dispersing aid and 50% DVE-3. The dispersion was prepared by mixing the components in the given amounts and passing the mixture through a bead mill until the dispersion had a particle size of less than 0.3 microns. Amounts are given as weight percentages based on the total weight of the dispersion.

Omnipol 9210, Speedcure 7010L, Esacure KIP 160 and Omnirad 819 are photoinitiators, as defined herein. Esacure KIP 160 is the only photoinitiator present that has a log $P_{octanol/water}$ value of less than 4.0, namely 3.0.

The viscosity of the ink was measured using an ARG2 rheometer manufactured by T.A. Instruments, which uses a 40 mm oblique/2° steel cone at 25° C. with a shear rate of 25 $s^{-1}$. All of the inkjet inks have a viscosity of less than 20 mPa·s and so have an ink-jettable viscosity.

The cure speed of the inks of Table 1 was assessed both before and after freezer storage. The presence of any precipitated photoinitiator was also assessed after freezer storage.

Before freezer storage, the inks were drawn down in a 12 μm film using a 12 μm wire wound K-bar onto a 220 μm PVC from Genotherm. The inks were then cured using a medium pressure Hg Heraeus Noblelight UV lamp of power rating 180 W/cm. The UV doses required for cure before freezer storage are shown in Table 1.

The inks were then stored at −15° C. for one week and before testing, transferred to a water bath at 25° C.

The inks were printed and cured in the same way as before freezer storage. The UV doses required for cure after freezer storage are shown in Table 1.

15 mL of each of the inks was also filtered through a 1.5 μm filter paper and the paper was visually inspected for any filtrate. The results are shown in Table 1.

As can be seen from Table 1, Ink 1 of the invention required the same low dose of UV radiation for cure before and after freezer storage and no photoinitiator precipitated after freezer storage. As such, Ink 1 has a high cure speed and excellent solubility stability.

In contrast to Ink 1 of the invention, comparative Ink 2 contained the same total amount of photoinitiators as Ink 1 but Esacure KIP 160 was present in an amount of 5.00% by weight, based on the total weight of the ink, and Omnipol 9210 was absent.

The presence of one or more photoinitiators each having a log $P_{octanol/water}$ value of less than 4.0 in more than 4.5% by weight, based on the total weight of the ink, means that although comparative Ink 2 required a low dose of UV radiation for cure before freezer storage, a higher dose of UV radiation for cure was required after freezer storage. Precipitated photoinitiator was observed after freezer storage, explaining the increase in dose of UV radiation required for cure. Therefore, comparative Ink 2 has a high cure speed but poor solubility stability.

In contrast to Ink 1 of the invention, comparative Ink 3 contained the same total amount of photoinitiators as Ink 1 and Esacure KIP 160 was present in the same amount as Ink 1, but Omnipol 9210 was absent.

Without the presence of at least one of Omnipol 910, Omnirad TPO-L, Omnipol BP, Omnipol 2702, Omnipol TX and/or Omnipol TP, comparative Ink 3 required a higher dose of UV radiation for cure than Ink 1. However, the dose of UV radiation for cure remained the same before and after curing and no photoinitiator precipitated after freezer storage because the ink contained no more than 4.5% by weight of one or more photoinitiators each having a log $P_{octanol/water}$ value of less than 4.0, based on the total weight of the ink. Comparative Ink 3 therefore has a low cure speed but excellent solubility stability.

Therefore, the examples show that the addition of at least one of Omnipol 910, Omnirad TPO-L, Omnipol BP, Omnipol 2702, Omnipol TX and/or Omnipol TP whilst restricting the amount of photoinitiators having a log $P_{octanol/water}$ value of less than 4.0 to 0.5-4.5% by weight, based on the total weight of the ink, increases the cure speed of the ink whilst maintaining the solubility stability.

Owing to the presence of 10-50% by weight of one or more monomers each having a log $P_{octanol/water}$ value of 5.0 or more, based on the total weight of the ink, the inks would also have good film properties such as water resistance.

What is claimed is:

1. An inkjet ink comprising:

10-50% by weight of one or more monomers each having a log $P_{octanol/water}$ value of 5.0 or more, based on the total weight of the ink;

a photoinitiator package comprising one or more photoinitiators each having a log $P_{octanol/water}$ value of less than 4.0, and one or more photoinitiators selected from

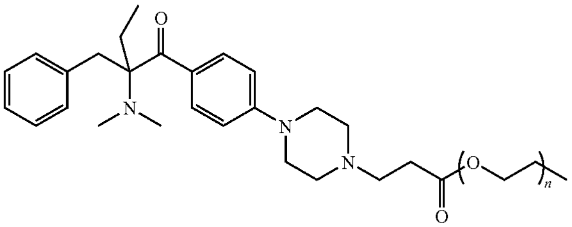

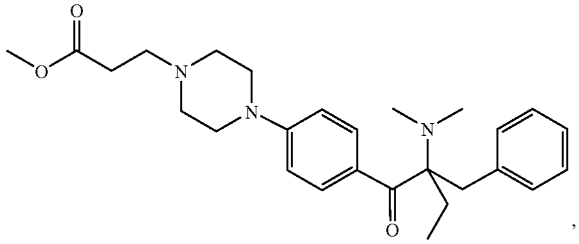

,

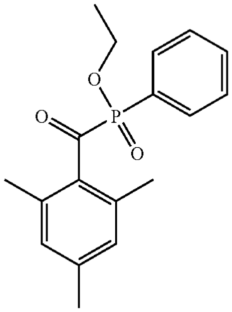

,

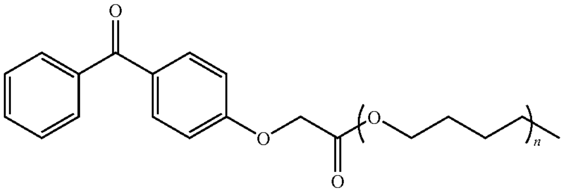

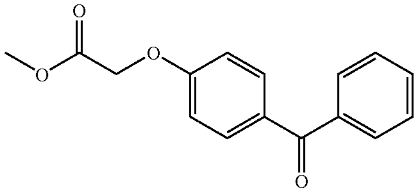

,

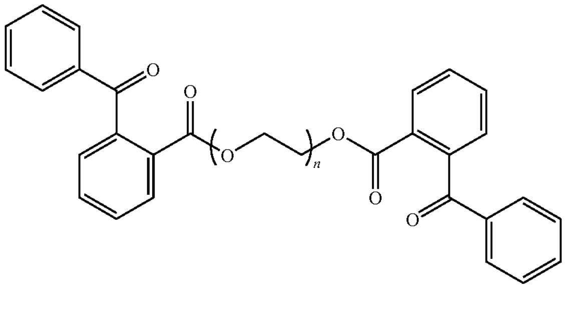

,

-continued

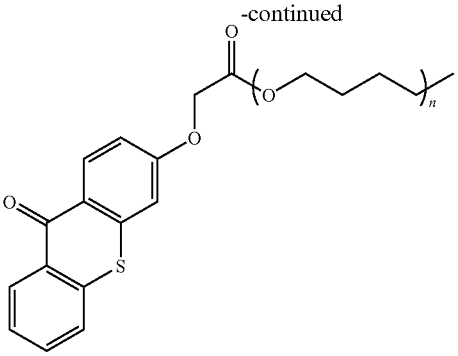

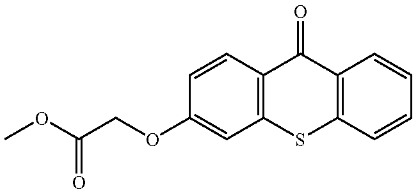

,

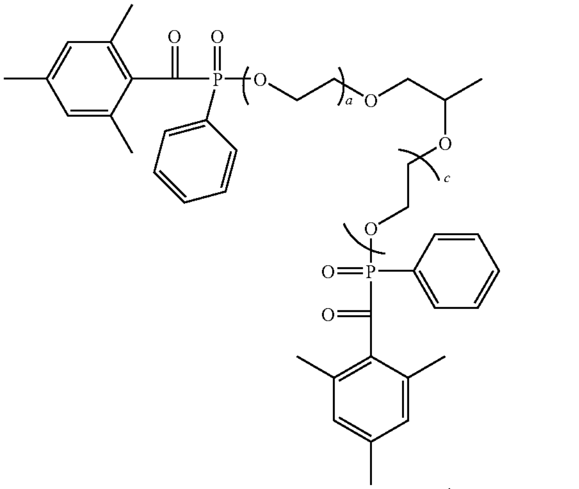

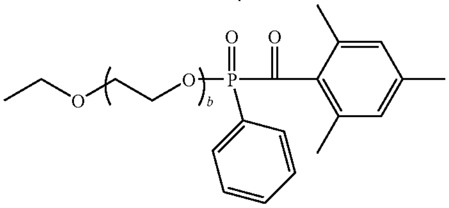

and mixtures thereof, wherein n is a value from 1 to 10 and a+b+c is a value from 1 to 20;

wherein the one or more photoinitiators each having a log $P_{octanol/water}$ value of less than 4.0 are present in the ink in an amount of 0.5-4.5% by weight, based on the total weight of the ink;

wherein the photoinitiator package is present in the ink in 15-30% by weight, based on the total weight of the ink; and wherein the ink comprises one or more monofunctional monomers, wherein the one or more monofunctional monomers consist of one or more monofunctional monomers each having a log $P_{octanol/water}$ value of 5.0 or more.

2. An inkjet ink as claimed in claim 1, wherein the ink comprises
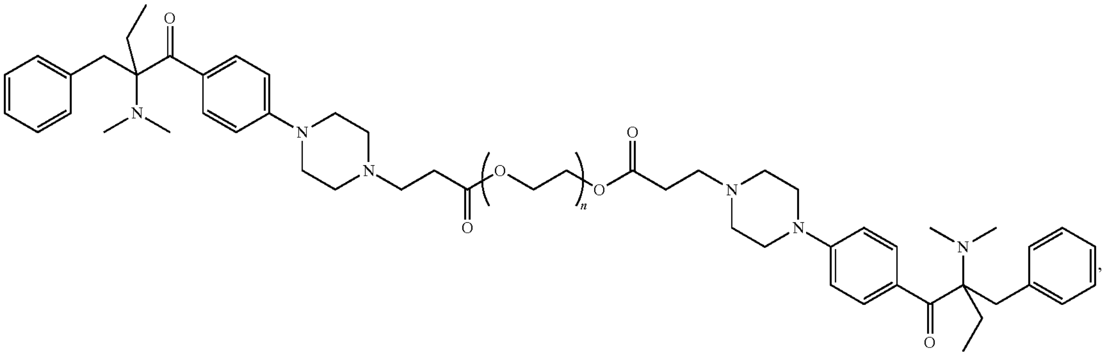
wherein n is a value from 1 to 10.
3. An inkjet ink as claimed in claim 1, wherein the one or more photoinitiators selected from
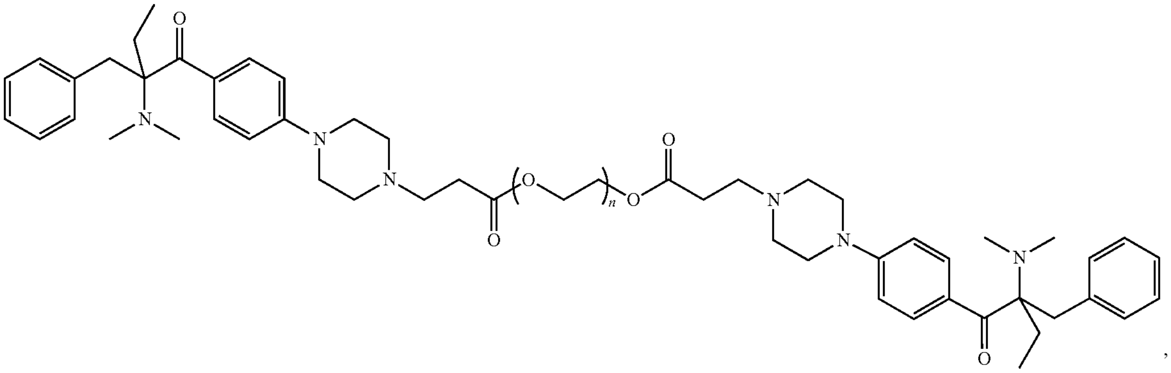
,
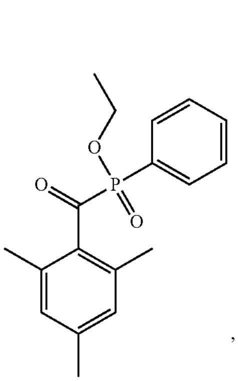
,
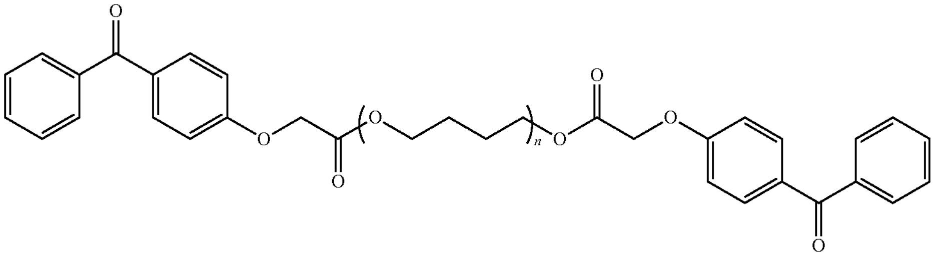
, -continued

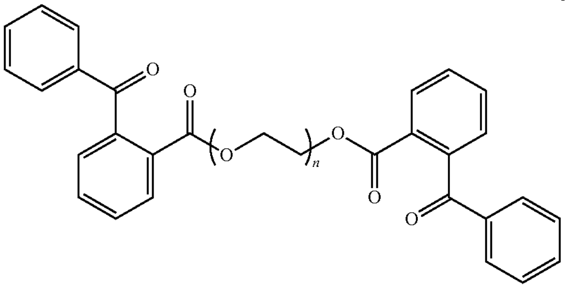

,

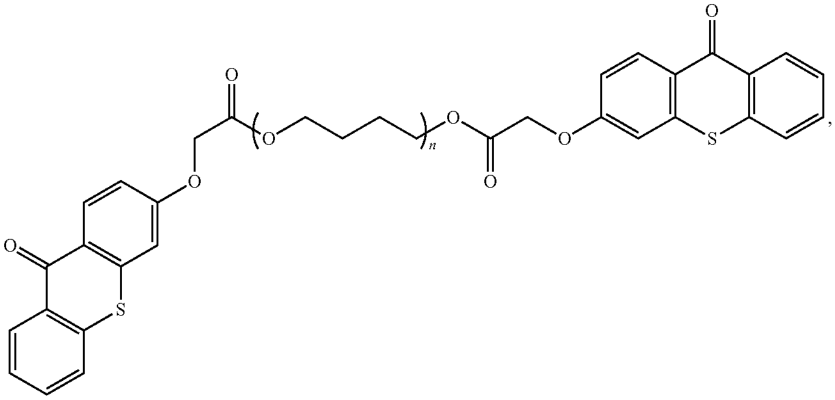

,

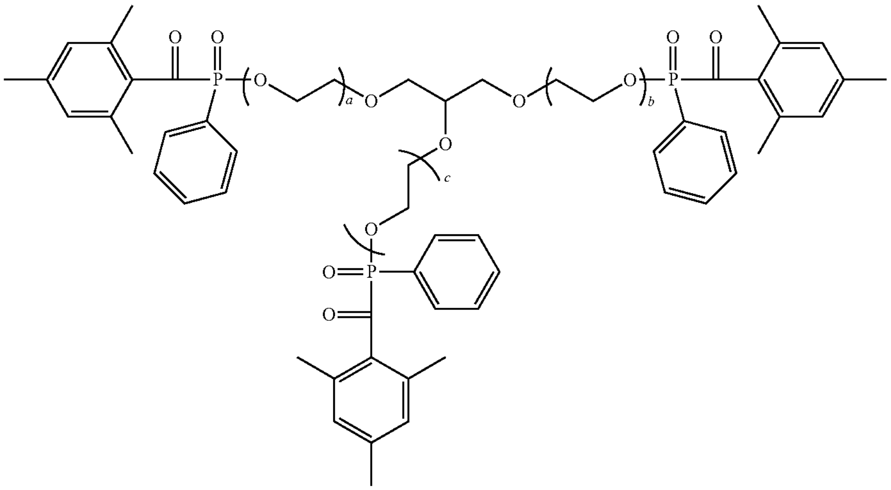

and mixtures thereof, wherein n is a value from 1 to 10 and a+b+c is a value from 1 to 20, are present in the ink in 1-10% by weight, based on the total weight of the ink.

4. An inkjet ink as claimed in claim 1, wherein the one or more photoinitiators each having a log $P_{octanol/water}$ value of less than 4.0 are present in the ink in an amount of 1.0-4.0% by weight, based on the total weight of the ink.

5. An inkjet ink as claimed in claim 1 wherein the photoinitiator package is present in the ink in 15-20% by weight, based on the total weight of the ink.

6. An inkjet ink as claimed in claim 1, wherein the photoinitiator package comprises one or more additional photoinitiators.

7. An inkjet ink as claimed in claim 6, wherein the one or more additional photoinitiators are selected from

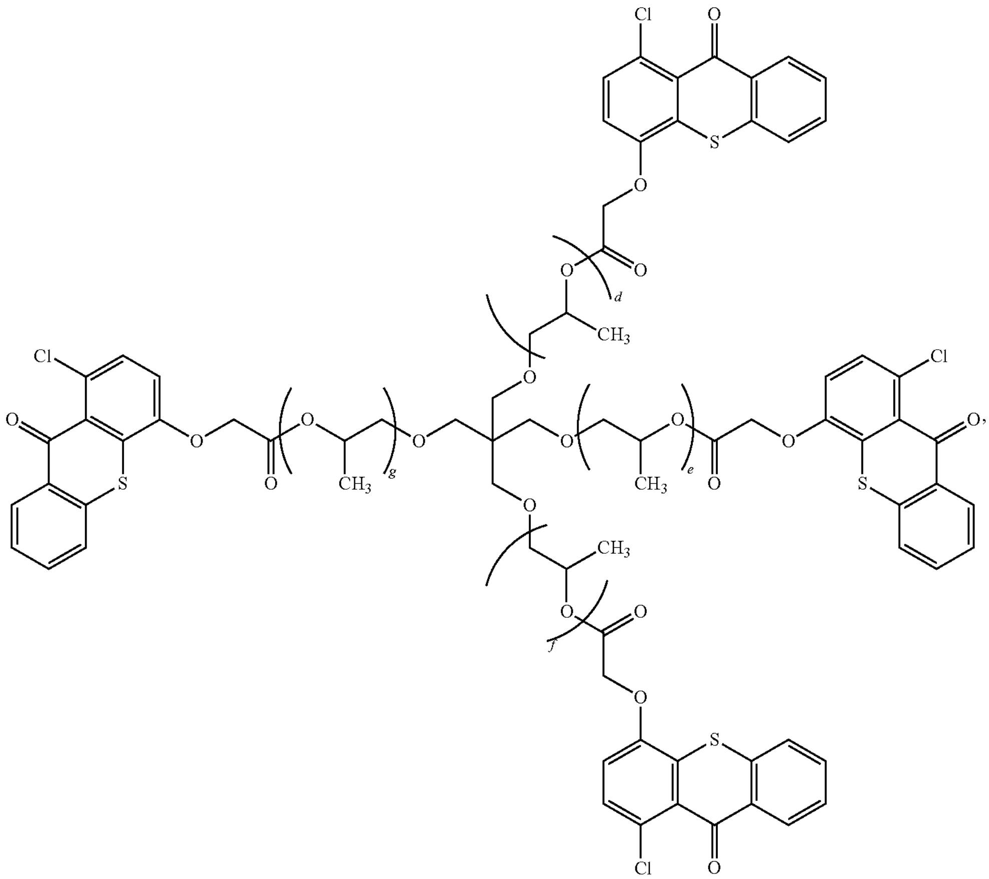

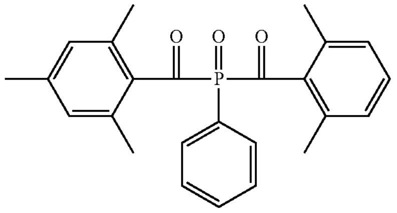

and mixtures thereof, wherein d+e+f+g is a value from 1 to 20.

8. An inkjet ink as claimed in claim 1, wherein the one or more monofunctional monomers comprise one or more monofunctional (meth) acrylate monomers.

9. An inkjet ink as claimed in claim 1, wherein the ink comprises lauryl acrylate.

10. An inkjet ink as claimed in claim 1, wherein the one or more monomers each having a log $P_{octanol/water}$ value of 5.0 or more are present in the ink in 15-40% by weight, based on the total weight of the ink.

11. An inkjet ink as claimed in claim 1, wherein the ink further comprises one or more additional monomers.

12. An inkjet ink as claimed in claim 11, wherein the one or more additional monomers are present in the ink in 20-80% by weight, based on the total weight of the ink.

13. A method of inkjet printing comprising inkjet printing the inkjet ink as claimed in claim 1, onto a substrate and curing the inkjet ink by exposing the inkjet ink to a curing source.

14. A method of inkjet printing as claimed in claim 13, wherein curing the ink by exposing the printed ink to a curing source comprises the following steps in order:

(i) partially curing the inkjet ink by exposing the inkjet ink to a first curing source; and (ii) fully curing the inkjet ink by exposing the inkjet ink to a second curing source.

15. A method of inkjet printing as claimed in claim 14, wherein the first curing source is a UV LED lamp and the second curing source is a source of low-energy electron beam radiation.

16. An inkjet ink as claimed in claim 11, wherein the one or more additional monomers are selected from 1,10-decanediol diacrylate (DDDA), hexanediol diacrylate (HDDA), polyethylene glycol diacrylate, tripropylene glycol diacrylate (TPGDA), 3-methyl 1,5-pentanediol diacrylate (3-MPDDA), dipropylene glycol diacrylate (DPGDA), tricyclodecane dimethanol diacrylate (TCDDMDA), propoxylated neopentyl glycol diacrylate (NPGPODA), trimethylolpropane triacrylate (TMPTA), di-trimethylolpropane tetraacrylate (DiTMPTA), di-pentaerythritol hexaacrylate (DPHA), ethoxylated trimethylolpropane triacrylate (EOTMPTA), ethoxylated pentaerythritol tetraacrylate (EO-PETTA), triethylene glycol divinyl ether (DVE-3) and mixtures thereof.

* * * * *